(12) United States Patent
Okubo et al.

(10) Patent No.: US 10,062,131 B2
(45) Date of Patent: Aug. 28, 2018

(54) ASSIGNMENT GUIDANCE IN CURATION LEARNING

(71) Applicant: FUJITSU LIMITED, Kawasaki-shi, Kanagawa (JP)

(72) Inventors: Yuko Okubo, Berkeley, CA (US); Jun Wang, San Jose, CA (US); Kanji Uchino, San Jose, CA (US)

(73) Assignee: FUJITSU LIMITED, Kawasaki (JP)

( * ) Notice: Subject to any disclaimer, the term of this patent is extended or adjusted under 35 U.S.C. 154(b) by 333 days.

(21) Appl. No.: 14/675,494

(22) Filed: Mar. 31, 2015

(65) Prior Publication Data
US 2016/0293035 A1  Oct. 6, 2016

(51) Int. Cl.
*G09B 7/00* (2006.01)
*G06Q 50/20* (2012.01)
*G09B 5/00* (2006.01)
*G09B 5/02* (2006.01)

(52) U.S. Cl.
CPC ........... *G06Q 50/205* (2013.01); *G09B 7/00* (2013.01); *G09B 5/00* (2013.01); *G09B 5/02* (2013.01)

(58) Field of Classification Search
CPC ........ G06Q 50/205; G06Q 50/20; G09B 7/00; G09B 7/06
USPC ...................................................... 434/362
See application file for complete search history.

(56) References Cited

U.S. PATENT DOCUMENTS

| | | | | | |
|---|---|---|---|---|---|
| 5,978,648 A | * | 11/1999 | George | ............ | G09B 7/04 434/118 |
| 6,976,170 B1 | * | 12/2005 | Kelly | ............ | G09B 7/02 713/170 |
| 7,937,338 B2 | * | 5/2011 | Boguraev | ............ | G06F 17/218 706/12 |
| 8,620,872 B1 | * | 12/2013 | Killalea | ............ | G06F 17/2211 707/687 |
| 8,666,961 B1 | * | 3/2014 | Qureshi | ............ | G06F 17/30312 707/705 |
| 9,430,468 B2 | * | 8/2016 | Lapulalan | ............ | G06F 17/30 |

(Continued)

FOREIGN PATENT DOCUMENTS

| | | |
|---|---|---|
| CA | 2 731 622 A1 | 3/2010 |
| WO | 2010/027887 A1 | 3/2010 |

*Primary Examiner* — Robert J Utama
(74) *Attorney, Agent, or Firm* — Maschoff Brennan

(57) ABSTRACT

A method includes generating a guidance template for an assignment that includes creation of a content curation (curation). The method includes storing a generated guidance template and a received curation that includes organized electronic items. The method includes scanning content of the received curation at a curation level and comparing the scan of the content with the guidance template. The method includes generating a curation-level assessment of the received content based on the comparison and generating a first suggested modification based on the curation-level assessment. The method includes assessing the received curation at an item level based on accessed electronic sources and generating a second suggested modification based on an item-level assessment. The method includes communicating the suggested modifications. The method includes receiving input effective to implement the first suggested modification and/or the second suggested modification and communicating a reward for implementation thereof.

20 Claims, 12 Drawing Sheets

(56) References Cited

U.S. PATENT DOCUMENTS

| | | | | |
|---|---|---|---|---|
| 2002/0194100 | A1* | 12/2002 | Choban | G06Q 40/06 |
| | | | | 705/36 R |
| 2005/0014122 | A1* | 1/2005 | Ruvinsky | G09B 7/02 |
| | | | | 434/350 |
| 2007/0294610 | A1* | 12/2007 | Ching | G06F 17/30014 |
| 2010/0104200 | A1* | 4/2010 | Baras | G06F 17/30648 |
| | | | | 382/209 |
| 2010/0311033 | A1* | 12/2010 | Jain | G09B 7/00 |
| | | | | 434/362 |
| 2011/0144977 | A1 | 6/2011 | Schulken | |
| 2011/0295595 | A1* | 12/2011 | Cao | G06F 17/2247 |
| | | | | 704/9 |
| 2012/0329014 | A1 | 12/2012 | Pham | |
| 2013/0124278 | A1* | 5/2013 | Najm | G06Q 30/0207 |
| | | | | 705/14.11 |
| 2013/0224719 | A1* | 8/2013 | Allen | G09B 7/00 |
| | | | | 434/350 |
| 2014/0065594 | A1* | 3/2014 | Venable | G09B 7/06 |
| | | | | 434/353 |
| 2014/0281856 | A1* | 9/2014 | Byrne | G06F 17/2235 |
| | | | | 715/205 |
| 2015/0093726 | A1* | 4/2015 | Duggan | G09B 19/00 |
| | | | | 434/156 |
| 2015/0118672 | A1* | 4/2015 | Yeskel | G09B 5/00 |
| | | | | 434/362 |
| 2015/0186787 | A1* | 7/2015 | Kumar | G06F 17/30011 |
| | | | | 706/12 |
| 2015/0269932 | A1* | 9/2015 | Evanini | G10L 15/1822 |
| | | | | 704/235 |

* cited by examiner

ASSIGNMENT GUIDANCE IN CURATION LEARNING

FIELD

The embodiments discussed herein are related to assignment guidance in curation learning.

BACKGROUND

In informal learning, a student may create a content curation (curation) that pertains to a topic. The curation may include a list of items, such as digital files and/or online media, which are organized by a curator, e.g., the student. The curation may also include content created by the student that characterizes or otherwise describes the items. In some informal learning systems, a teacher may assign to the student a creation of a curation pertaining to a topic. Due in part to automation that is implemented in the creation of curations, the items included in a curation may lack any input from the student. Additionally, one or more of the items may not be relevant to the topic.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method includes generating, by one or more processors, a guidance template for an assignment that includes creation of a content curation (curation). The method may include storing a received curation and the guidance template, at least temporarily, in one or more non-transitory media. The received curation may include one or more electronic items that are organized relative to one another. The method may include digitally scanning, by the one or more processors, digital content of the received curation at a curation level. The method may include comparing, by the one or more processors, the digital scan of the digital content with the guidance template. The method may include generating, by the one or more processors, a curation-level assessment of the received content based on the comparison between the digital scan of the content and the guidance template. The method may include generating, by the one or more processors, a first suggested modification based on the curation-level assessment. The first suggested modification may include a curation-level message that suggests an amendment that conforms the received curation to the guidance template. The method may include accessing, by the one or more processors, electronic sources of the items via a network. The method may include assessing the received curation at an item level by the one or more processors based on accessed electronic sources. The method may include generating, by the one or more processors, a second suggested modification based on an item-level assessment. The second suggested modification may include an item-level message that suggests an amendment that conforms the received curation to the guidance template. The method may include communicating the first suggested modification and the second suggested modification to a student device via the network. The method may include receiving input effective to implement one or more of the first suggested modification and the second suggested modification from the student device via the network. The method may include communicating a reward for implementation of one or more of the first suggested modification and the second suggested modification to the student device via the network.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

In informal learning, some of the benefits of content curations (curation or curations), especially automated curations, may work against expectations of an assignment that involves creation of a curation by a student. For example, some of the benefits of curations may include the relative ease at which references from multimedia sources may be found for a topic. Additionally, another benefit may include automated extraction of descriptions and/or summaries from the multimedia sources. These and other benefits of the curations may work against expectations of assignments such as student-edited texts extracted from the multimedia sources, and addition of student views and perspectives to content aggregated in the curation.

Accordingly, some embodiments discussed herein are related to assignment guidance in curation learning. These and other embodiments guide students who do not edit automatically-extracted sections, who miss the structure, or who miss one or more key topics. An example embodiment includes a method of assignment guidance. The method includes generating a guidance template for an assignment that includes creation of a curation. The guidance template may be based on input from a teacher. The method may include assessing a received curation at a curation level and at an item level. Based on the curation-level assessment and the item-level assessment, suggested modifications that suggest amendments that conform the received curation to the guidance template may be generated. The suggested modifications are communicated to a student. The method may include receiving input from the student effective to implement one or more of the suggested modifications. The method may include rewarding the student for implementation of the suggested modifications. A self-assessment and a report may be generated that include the suggested modifications and rewards. The self-assessment may be communicated to the student and the report may be communicated to the teacher. The teacher may grade the student based at least partially on the report. This and other embodiments are described with reference to the appended figures.

Figure 1:
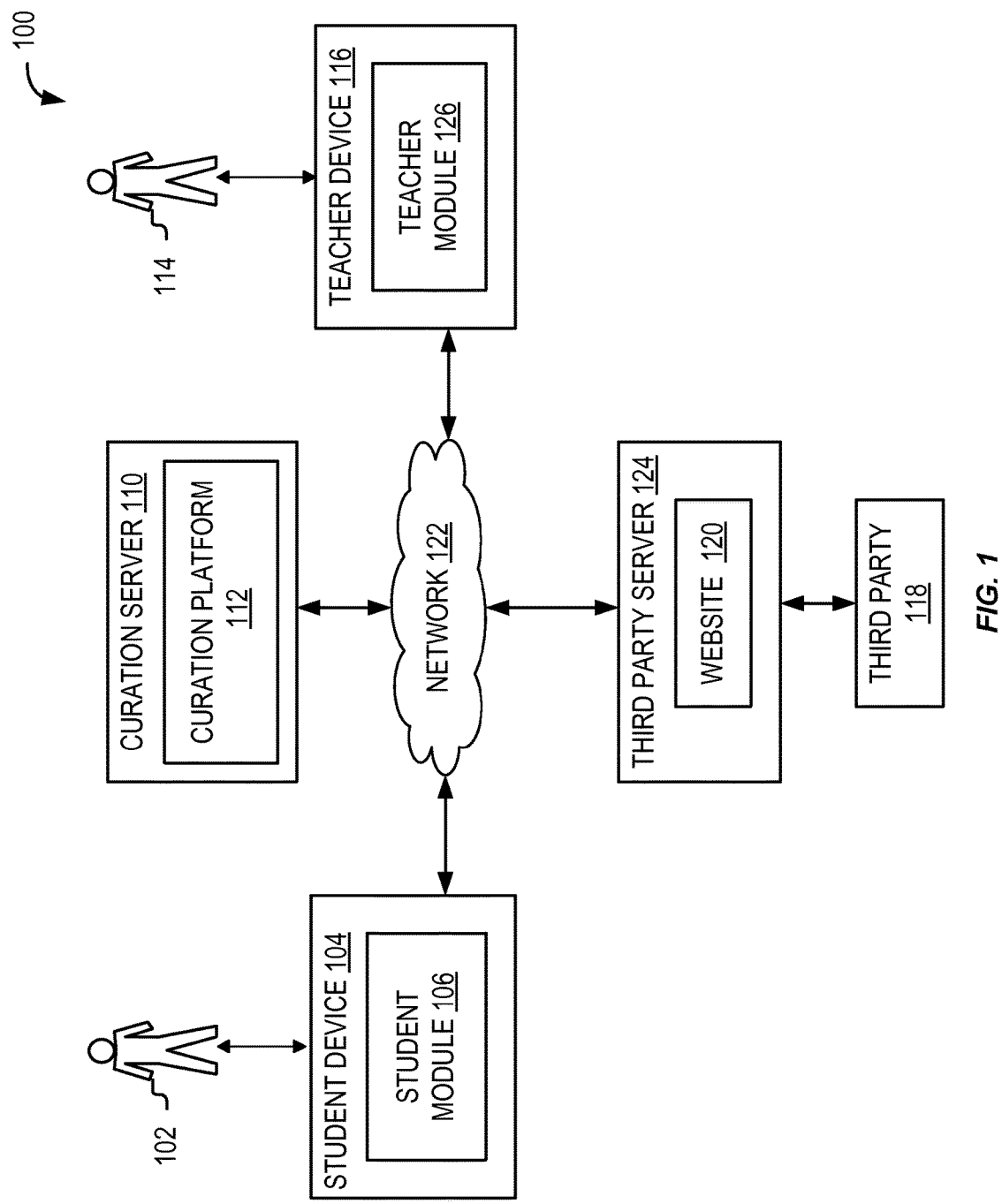
FIG. 1 illustrates a block diagram of an example learning environment.

FIG. 1 illustrates a block diagram of an example learning environment 100 in which some embodiments described herein may be implemented. In the learning environment 100, a teacher 114 may generate an assignment for a student 102 to create a curation. The student 102 may create a curation based on the assignment. The student 102 may receive suggested modifications from a curation server 110. The suggested modifications may assist the student 102 in creating or amending the curation such that the curation better conforms to the assignment. Moreover, the suggested modifications may be directed at encouraging the student to include personal content in the curation. The curation server 110 may provide to the teacher 114 a report that may include a score indicating the conformity of the curation to the assignment and one or more other criteria. The teacher 114 may grade the student 102 based at least partially on the report. The curation server 110 may also provide to the student 102 a self-assessment that may include the score.

The learning environment 100 may include a student device 104, the curation server 110, a teacher device 116, and a third party server 124 that may communicate via a network 122. The student device 104, the curation server 110, the teacher device 116, and the third party server 124 may be configured to communicate data and information related to curations via the network 122. For example, curations, assignments, reports, self-assessments, suggested modifications, and input may be communicated between the curation server 110, the student device 104, and the teacher device 116. Additionally, the third party server 124 may be accessed by the student device 104, the curation server 110, and the teacher device 116 via the network 122. For example, during creation of the curation, the student device 104 may access the third party server 124 to obtain information. An item included in the curation may be derived from the information. Similarly, the curation server 110 may access the information on the third party server 124. The information accessed by the curation server 110 may serve as a basis of analysis conducted on the curation.

The student 102 may be associated with the student device 104, the teacher 114 may be associated with the teacher device 116, and a third party may be associated with the third party server 124. As used to describe the relationship between the student 102 and the student device 104, the teacher 114 and the teacher device 116, and a third party 118 and the third party server 124, the term "associated with" may indicate that the student 102, the teacher 114, or the third party 118 operates and/or controls the student device 104, the teacher device 116, or the third party server, respectively.

The network 122 may be wired or wireless. The network 122 may have numerous configurations including a star configuration, a token ring configuration, or another suitable configuration. Furthermore, the network 122 may include a local area network (LAN), a wide area network (WAN) (e.g., the Internet), and/or other interconnected data paths across which multiple devices may communicate. In some embodiments, the network 122 may include a peer-to-peer network. The network 122 may also be coupled to or include portions of a telecommunications network that may enable communication of data in a variety of different communication protocols.

In some embodiments, the network 122 includes BLUETOOTH® communication networks and/or cellular communications networks for sending and receiving data including via short messaging service (SMS), multimedia messaging service (MMS), hypertext transfer protocol (HTTP), direct data connection, wireless application protocol (WAP), e-mail, etc.

In the depicted embodiment, the student 102 may include any individual or entity that is interfacing with the curation server 110. The student 102 may have enrolled in a course taught by the teacher 114 in some embodiments. The student 102 may accordingly create a curation in accordance with an assignment issued by the teacher 114.

The student 102 may be associated with the student device 104, which may enable interaction with the learning environment 100. The student device 104 may include a computing device that includes a processor, memory, and network communication capabilities. For example, the student device 104 may include a laptop computer, a desktop computer, a tablet computer, a mobile telephone, a personal digital assistant ("PDA"), a mobile e-mail device, a portable game player, a portable music player, a television with one or more processors embedded therein or coupled thereto, or other electronic device capable of accessing the network 122.

The student device 104 may include a student module 106. The student module 106 or a portion thereof installed on the student device 104 may be configured to enable interaction of the student 102 in the learning environment 100. For example, the student module 106 may be configured to provide a user interface that allows the student 102 to access a curation platform 112 and/or a website 120. The student 102 may also create and/or amend curations using the student module 106.

Additionally, the student module 106 may enable communication of information between the student device 104, one or more of the third party servers 124, the curation server 110, and the teacher device 116. For example, an assignment issued by the teacher 114 may be received using the student module 106. Additionally or alternatively, suggested modifications and/or self-assessments may be received using the student module 106.

In some embodiments, the student module 106 or some portion thereof may be included on the curation server 110. In these and other embodiments, the student device 104 may access the student module 106 hosted on the curation server 110. One or more of the functionalities discussed herein that are attributed to the student module 106 may be performed by the curation server 110 in response to input of the student 102 received at the student device 104 and communicated to the curation server 110. For example, the student 102 may access the student module 106 or some portion thereof included on the curation server 110 using a browser interface.

The teacher 114 may include an individual, group of individuals, or another entity that may be interfacing in the learning environment 100. The teacher 114 may generate assignments. The assignments may involve the student 102 creating a curation. The curation may pertain to a particular topic in some instances. Additionally, the teacher 114 may generate input. The input may include information related to the assignment. The input may be indicative of the content and items that may be relevant to the assignment and/or appropriately included in the curation. For example, input may include a structure of the curation, highlighted syllabuses, highlighted instructions, highlighted lecture slides, other input, or any combination thereof.

The teacher 114 may be associated with the teacher device 116, which may enable the teacher 114 to interface with the learning environment 100. The teacher device 116 may include a computing device that includes a processor, memory, and network communication capabilities. For example, the teacher device 116 may include a laptop computer, a desktop computer, a tablet computer, a mobile telephone, a personal digital assistant ("PDA"), a mobile e-mail device, a portable game player, a portable music player, a television with one or more processors embedded therein or coupled thereto, or other electronic device capable of accessing the network 122.

The teacher device 116 may include a teacher module 126. The teacher module 126 or a portion thereof installed on the teacher device 116 may be configured to enable interaction of the teacher 114 in the learning environment 100. For example, the teacher module 126 may be configured to provide a user interface that allows the teacher 114 to communicate the assignment and/or the input to the curation platform 112. Additionally, the teacher module 126 may be configured to receive communications and/or data such as reports from the curation server 110. Additionally, in some embodiments, the teacher module 126 may be configured to receive curations from the student device 104 and/or the curation server 110.

In some embodiments, the teacher module 126 or some portion thereof may be included on the curation server 110. In these and other embodiments, the teacher device 116 may access the teacher module 126 hosted on the curation server 110. One or more of the functionalities discussed herein that are attributed to the teacher module 126 may be performed by the curation server 110 in response to input of the teacher 114 received at the teacher device 116 and communicated to the curation server 110. For example, the teacher 114 may access the teacher module 126 or some portion thereof included on the curation server 110 using a browser interface.

The third party 118 may include any entity or entities that controls content of the website 120 hosted on the third party server 124. The third party 118 may include, for example, an individual or a group of individuals that post content such as news stories, articles, videos, audio files, images, and the like.

The third party server 124 may include a hardware server that includes a processor, memory, and communication capabilities. In the illustrated embodiment, the third party server 124 may be coupled to the network 122 to send and receive data to and from the teacher device 116, the student device 104, and the curation server 110 via the network 122. The third party server 124 may be configured to host the website 120 and enable access to the content on the website 120 via the network 122.

For example, using the student device 104, the student 102 may access the website 120 to view content on the website 120. The student 102 may then add an item to a curation based on the content. Additionally, the curation platform 112 may receive the curation including the item based on the content. The curation platform 112 may access the content and perform an analysis of the item and the curation based on the content.

The curation server 110 may include a hardware server that includes a processor, memory, and communication capabilities. In the illustrated embodiment, the curation server 110 may be coupled to the network 122 to send and receive data to and from the teacher device 116, the student device 104, and the third party server 124 via the network 122. The curation server 110 may be included in the curation platform 112.

The curation platform 112 may be configured to provide the student 102 assignment guidance related to a curation. The assignment guidance may be based on a guidance template that may be generated by the curation platform 112. The guidance template may be based on the input communicated from the teacher 114.

The curation platform 112 may assess a curation on a curation level and on an item level. Generally, the curation level is broader than the item level. An assessment at the curation level may view the curation as a single document. The assessment at the curation level may include digitally scanning digital content of the curation at a curation level. The digital scan of the digital content may be compared with the guidance template. A curation-level assessment of the received content may be generated based on the comparison between the digital scan of the content and the guidance template.

The assessment at the curation level may determine whether the overall structure and content of the curation conforms to the guidance template. An assessment at the item level may include an evaluation of one or more items included in the curation. The assessment at the item level may determine whether the one or more items conform to the guidance template.

The curation platform 112 may generate curation-level suggested modifications and item-level suggested modifications (collectively, suggested modifications) based on the curation-level assessment and the item-level assessment. The curation platform 112 may communicate the suggested modifications to the student device 104 and/or to the student 102. The student 102 may implement the suggested modifications to amend the curation. For example, the student 102 may use the student module 106 to amend the curation.

The curation platform 112 may reward the student 102 for implementing one or more of the suggested modifications. Additionally, the curation platform may communicate a self-assessment to the student 102 that includes the reward. The reward may include points or percentage points, for instance, that may contribute to a grade that is awarded to the student 102 for the assignment. Additionally, the curation platform 112 may provide a report to the teacher 114. The report may include, for example, results of the item-level assessment, results of the content-level assessment, suggested modifications implemented by the student 102, other criteria (e.g., no suggested modifications, time, length, depth of items, timeliness of items, and the like), or some combination thereof.

The teacher 114 may receive the report. Based at least partially on the report, the teacher 114 may grade the student 102. Accordingly, the teacher 114 may save time by relying at least partially on the report.

Modifications, additions, or omissions may be made to the learning environment 100 without departing from the scope of the present disclosure. Specifically, embodiments of the learning environment 100 depicted in FIG. 1 include one student 102, one teacher 114, one student device 104, one teacher device 116, one curation server 110, and one third party server 124. However, the present disclosure applies to a learning environment 100 that may include one or more students 102, one or more teachers 114, one or more student devices 104, one or more teacher devices 116, one or more curation servers 110, one or more third party servers 124, or any combination thereof.

Moreover, the separation of various components in the embodiments described herein is not meant to indicate that the separation occurs in all embodiments. Additionally, it may be understood with the benefit of this disclosure that the described components may be integrated together in a single component or separated into multiple components.

The curation platform 112, the student module 106, and the teacher module 126 may include code and routines that perform one or more operations as described herein. In some embodiments, one or more of the curation platform 112, the student module 106, and the teacher module 126 act in part as a thin-client application that may be stored on a computing device, such as the student device 104 and/or the teacher device 116, and in part as components that may be stored on the curation server 110, for instance. In some embodiments, one or more of the curation platform 112, the student module 106, and the teacher module 126 may be implemented using hardware including a field-programmable gate array (FPGA) or an application-specific integrated circuit (ASIC). In some other instances, one or more of the curation platform 112, the student module 106, and the teacher module 126 may be implemented, at least partially, using a combination of hardware and software.

Figure 2:
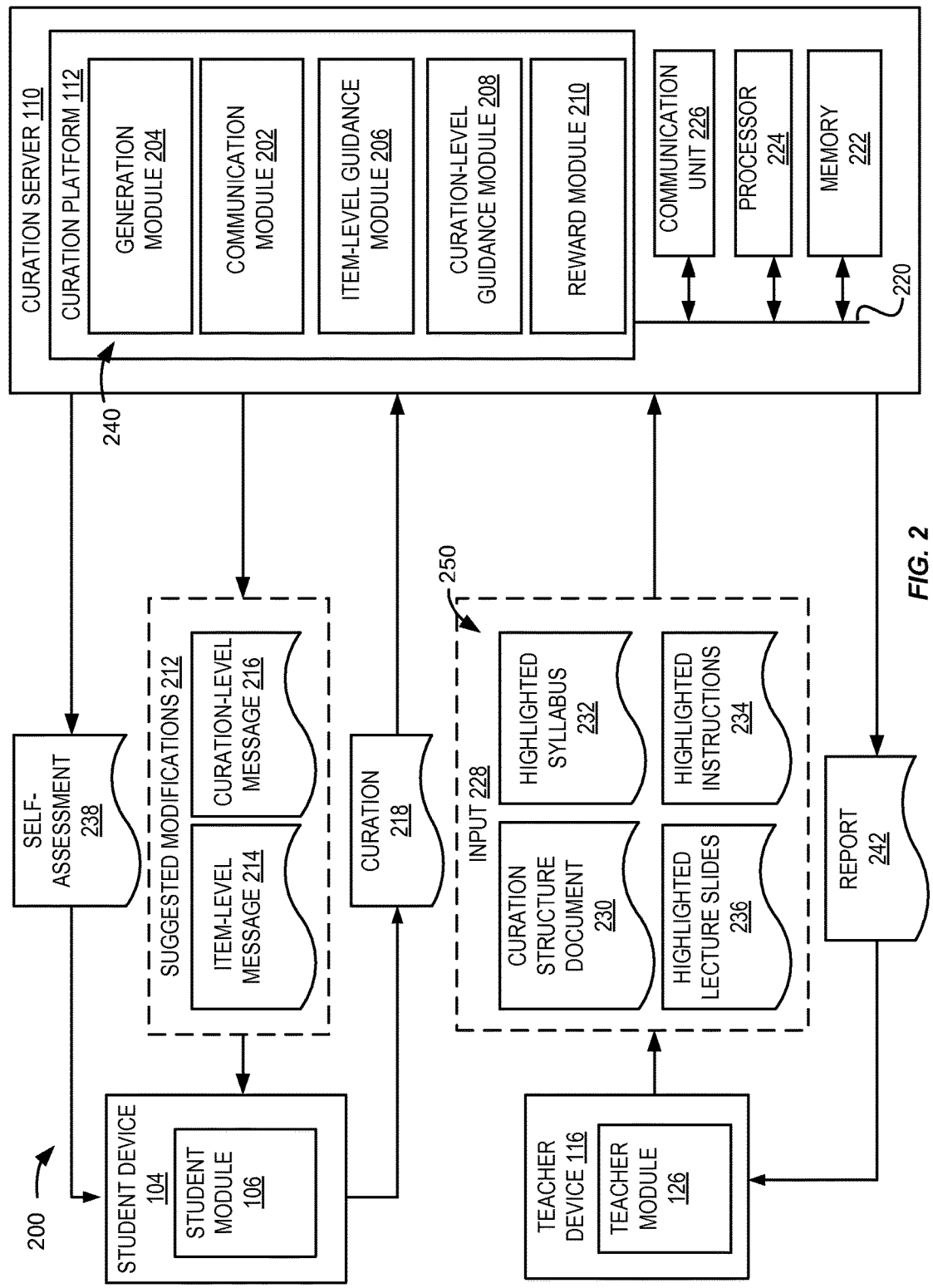
FIG. 2 illustrates a block diagram of an example assignment guidance system that may be implemented in the learning environment of FIG. 1.

FIG. 2 illustrates a block diagram of an example assignment guidance system (guidance system) 200 that may be implemented in the learning environment 100 of FIG. 1. The guidance system 200 may include one or more components (e.g., the student device 104, the teacher device 116, the student module 106, the teacher module 126, the curation server 110, and the curation platform 112) described with reference to FIG. 1. An example of the curation server 110 is shown in FIG. 2 in more detail. Although not depicted in FIG. 2, communications between the student device 104, the teacher device 116, and the curation server 110 may occur via the network 122 discussed with reference to FIG. 1.

The curation server 110 of FIG. 2 may include the curation platform 112, a processor 224, a memory 222, and a communication unit 226. The components of the curation server 110 may be communicatively coupled by a bus 220. The bus 220 may include at least one of a memory bus, a storage interface bus, a bus/interface controller, an interface bus, or other suitable communication bus.

The processor 224 may include an arithmetic logic unit (ALU), a microprocessor, a general-purpose controller, or some other processor array to perform computations and software program analysis. The processor 224 may be coupled to the bus 220 for communication with the other components (e.g., 112, 226, and 222). The processor 224 generally processes data signals and may include various computing architectures including a complex instruction set computer (CISC) architecture, a reduced instruction set computer (RISC) architecture, or an architecture implementing a combination of instruction sets. Although FIG. 2 includes a single processor 224, multiple processors may be included in the curation server 110. Other processors, operating systems, and physical configurations may be possible.

The memory 222 may be configured to store instructions and/or data that may be executed by the processor 224. The memory 222 may be coupled to the bus 220 for communication with the other components. The instructions and/or data may include code for performing the techniques or methods described herein. The memory 222 may include a DRAM device, an SRAM device, flash memory, or some other memory device. In some embodiments, the memory 222 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

The communication unit 226 may be configured to transmit and receive data to and from one or more of the teacher device 116 and the student device 104. The communication unit 226 may be coupled to the bus 220. In some embodiments, the communication unit 226 includes a port for direct physical connection to the network 122 or to another communication channel. For example, the communication unit 226 may include a universal serial bus (USB) port, a secure digital (SD) port, a category 5 cable (CAT-5) port, or similar port for wired communication with the components of the learning environment 100 of FIG. 1. In some embodiments, the communication unit 226 includes a wireless transceiver for exchanging data via communication channels using one or more wireless communication methods, including IEEE 802.11, IEEE 802.16, BLUETOOTH®, or another suitable wireless communication method.

In some embodiments, the communication unit 226 includes a wired port and a wireless transceiver. The communication unit 226 may also provide other connections for distribution of files and/or media objects using standard network protocols including transmission control protocol/internet protocol (TCP/IP), HTTP, HTTP secure (HTTPS), and simple mail transfer protocol (SMTP), etc. In some embodiments, the communication unit 226 includes a cellular communications transceiver for sending and receiving data over a cellular communications network including via SMS, MMS, HTTP, direct data connection, WAP, e-mail, or another suitable type of electronic communication.

In the embodiment of FIG. 2, the curation platform 112 may include a communication module 202, a generation module 204, an item-level guidance module 206, a curation-level guidance module 208, and a reward module 210 (collectively guidance modules 240). One or more of the guidance modules 240 may be implemented as software including one or more routines configured to perform one or more operations. The guidance modules 240 may include a set of instructions executable by the processor 224 to provide the functionality described herein. In some instances, the guidance modules 240 may be stored in or at least temporarily loaded into the memory 222 and may be accessible and executable by the processor 224. One or more of the guidance modules 240 may be adapted for cooperation and communication with the processor 224 and components of the curation server 110 via the bus 220.

The communication module 202 may be configured to handle communications between the curation platform 112 and other components of the curation server 110 (e.g., 224, 222, and 226). The communication module 202 may be configured to send data to and receive data from the student device 104 and/or the teacher device 116 via the communication unit 226. In some instances, the communication module 202 may cooperate with the other modules (e.g., 204, 206, 208, and 210) to receive and/or forward, via the communication unit 226, data from the student device 104 and/or the teacher device 116.

For example, the communication module 202 may be configured to receive input 228 from the teacher device 116 and/or the teacher module 126. The input 228 may be indicative of the content and items that may be relevant to an assignment and/or that may be appropriately included in a curation. For example, the input 228 may include a curation structure document 230 and/or instructional materials 250 including highlighted sections. Highlighted sections may indicate specific key words that are identified as relevant by a teacher such as the teacher 114 of FIG. 1. The instructional materials 250 may include a highlighted syllabus 232, highlighted lecture slides 236, and highlighted instructions 234, for instance. The communication module 202 may communicate the input 228 to the generation module 204.

The generation module 204 may be configured to generate a guidance template for an assignment that includes a curation. For example, the generation module 204 may digitally scan the input 228 such as the highlighted portions of the instructional materials 250 and the curation structure document 230. Based on the scanned input, the generation module 204 may create a template for a curation structure.

The generation module 204 may extract keywords from the scanned highlighted portions and assign weights to the extracted keywords. At least some portion of the extracted keywords with the assigned weights may be referred to as key topics.

In some embodiments, the generation module 204 may assign the weights based on the instructional material 250 from which the extracted keyword is extracted. For example, a first extracted keyword may be extracted from the highlighted syllabus 232 and a second extracted keyword may be extracted from the highlighted lecture slides 236. The first extracted keyword may be assigned a first weight of 2 and the second extracted keyword may be assigned a second weight of 1, for instance. In some embodiments, the weights may be based on a frequency with which the extracted keyword appears in the input, a type of highlighting, a particular location in a particular instructional material 250, the instructional material 250 from which the extracted keyword is extracted, or any combination thereof. Additionally or alternatively, the weights may range from zero to one, may sum to one, or may include other suitable values and may be assigned according to other suitable criteria.

The generation module 204 may combine the extracted keywords with the template for the curation structure to generate the guidance template. In some embodiments, the guidance template may include a structure of the curation. For example, the structure of the curation may include an introduction, main content, and a conclusion. Accordingly, the structure of the curation included in the guidance template may be used to determine whether the curation and/or the items of a curation include an introduction, main content, and a conclusion. Additionally, the guidance template may include coverage of key topics, which may be based on the extracted keywords. The coverage of the key topics may be used to determine whether a curation and/or the items include appropriate key topics.

In some embodiments, the extracted keywords may be grouped according to the assigned weights. For instance, the guidance template may include a first subset of extracted keywords with a first assigned weight of 1, a second subset of extracted keywords with a second assigned weight of 2, and a third subset of extracted keywords with assigned weights of 3 or more.

The communication module 202 may be configured to receive a curation 218 from the student device 104 and/or the student module 106. The curation 218 may be generated according to the assignment of a teacher as described above. Generally, the curation 218 may include one or more items. The items may be based on content that is available on a third party server such as the third party server 124. Additionally, the items may include content added by a student. For instance, the student may add some comments to one or more items in the curation 218. The items may include any form of digital media such as articles, video, audio files, documents, presentations, images, drawings, and the like.

The curation 218 may be forwarded from the communication module 202 to the item-level guidance module 206 and the curation-level guidance module 208 (collectively, guidance modules 206/208). The guidance modules 206/208 may be configured to perform an assessment of the curation 218. The assessment may include an analysis of the curation 218 based on the generated guidance template. During the assessment, the guidance modules 206/208 may determine that the curation 218 includes one or more deficiencies. Based on the assessment, the guidance modules 206/208 may generate suggested modifications 212. The suggested modifications 212 may include messages 214 and 216 that suggest a change to the curation 218, which may conform the curation to one or more parts of the guidance template.

In particular, the item-level guidance module 206 may be configured to perform an item-level assessment of the curation 218. Based on the item-level assessment, the item-level guidance module 206 may generate one or more item-level messages 214. Analogously, the curation-level guidance module 208 may be configured to perform a curation-level assessment of the curation 218. Based on the curation-level assessment, the curation-level guidance module 208 may generate one or more curation-level messages 216.

To perform the item-level assessment, the item-level guidance module 206 may access an electronic source and/or the original content on which one or more items in the curation 218 are based. For example, with combined reference to FIGS. 1 and 2, the item-level guidance module 206 may access the website 120 hosted on the third party server 124. The item-level guidance module 206 may download or otherwise access content included in the website 120 on which one or more items of the curation 218 are based.

Additionally, the item-level guidance module 206 may access the guidance template. For example, the guidance template may include extracted keywords and assigned weights. The item-level guidance module 206 may make one or more determinations regarding one or more of the items included in the curation 218 using the original content and the guidance template.

For example, an item-level assessment may be performed by the item-level guidance module 206 of each of the items of the curation 218. The item-level guidance module 206 may determine whether each item is edited by the student, determine whether text of the item is plagiarized, detect a topic match between original content and the item, or some combination thereof.

To determine whether the item is edited by the student, the item-level guidance module 206 may determine which of the items are auto-extracted. In some embodiments, the curation platform 112 may be capable of performing searches of third party servers, such as the third party server 124 of FIG. 1, and extract descriptions. The auto-extracted descriptions may be added to the curation 218 without action by the student. The item-level guidance module 206 may compare the item in the curation 218 with the original content to determine whether the auto-extracted descriptions have been edited by the student.

To determine whether text of the item is plagiarized, the item-level guidance module 206 may perform a search of the text included in the items. The item-level guidance module 206 may then determine whether the text of the items have been copied from a web page.

To detect the topic match, the item-level guidance module 206 may determine whether one or more of a title and a description of the item match or approximately match a title and a description, respectively, of an electronic source. In some embodiments, an approximate match may be determined using a similarity calculation. In the similarity calculation, the title and description of the item may be represented as an item vector. In the item vector, the weight assigned to extracted keywords may be included and/or doubled, for instance. Additionally, the original content may be represented as an original content vector. The similarity between the item vector and the original content vector may be calculated as a cosine therebetween. When the similarity is above a first particular threshold, the item-level guidance module 206 may determine there is a match or an approximate match between the original content vector and the item vector, which may indicate the topic of the item is that of the original content. The first particular threshold may be an ad-hoc value decided by previous experiments/experience, may be determined by some training data, may be determined by machine learning, or some combination thereof. An example of the first particular threshold may be 0.8, which may indicate that the original content vector and the item vector are approximately similar.

In response to the determinations that the auto-extracted description of the item is not edited, the text of the item is plagiarized, or to one or more of the title and the description of the item not matching or approximately matching the title and the description of the electronic source, the item-level guidance module 206 may generate the item-level messages 214. For example, in response to the auto-extracted description of the item not being edited, the item-level guidance module 206 may generate the item-level message 214 that may include a suggestion to edit the auto-extracted description. In response to the text of the item being plagiarized, the item-level guidance module 206 may generate the item-level message 214 that may include a suggestion to edit the plagiarized text. In response to one or more of the title and the description of the item not matching or approximately matching the title and the description of the electronic source, the item-level guidance module 206 may generate the item-level message 214 that may include a suggestion to amend one or more of the title and the description of the item to match the title and the description of the electronic source.

The item-level messages 214 may be communicated to the communication module 202, which may communicate the item-level messages 214 to the student device 104 and/or the student module 106.

To perform the curation-level assessment, the curation-level guidance module 208 may access the guidance template. For example, the guidance template may include the structure of the curation as well as key topics which include extracted keywords and assigned weights. The curation-level guidance module 208 may make one or more determinations regarding the curation 218 using the guidance template. For example, the curation-level guidance module 208 may determine whether a structural element of the curation 218 is missing and determine whether a key topic is missing from the curation 218.

To determine whether a structural element is missing, the curation-level guidance module 208 may digitally scan the curation 218 and items included in the curation 218 to detect words and phrases indicating structural components. For example, "in summary" may indicate a portion of the curation 218 that is a conclusion and/or "Introduction" may indicate a portion of the curation 218 that is an introduction. The curation-level guidance module 208 may then determine whether there is a match or an approximate match between indicated structural components and structure of the curation included in the guidance template. In response to there not being a match or an approximate match between the indicated structural components and the structure of the curation of the guidance template, the curation-level guidance module 208 may determine which structural elements of the guidance template are missing from the curation 218. The curation-level guidance module 208 may then generate the curation-level message 216 that may include a suggestion to amend a structure of the curation 218.

To determine whether a key topic is missing, the curation-level guidance module 208 may digitally scan the curation 218 and items included in the curation 218 to detect keywords of the curation 218. Treating the curation 218 as a document, the curation-level guidance module 208 may calculate a similarity between the keywords of the curation 218 and the extracted keywords of the guidance template. The similarity may be performed according to the similarity calculation discussed above. In particular, the curation 218 may be represented as a curation vector. Additionally, the extracted keywords of the guidance template may be represented as a template vector. In the template vector, the weight assigned to extracted keywords may be included and/or doubled, for instance. The similarity between the curation vector and the template vector may be calculated as a cosine therebetween.

In response to the calculated similarity being above a second particular threshold, the curation-level guidance module 208 may determine the curation includes the extracted keywords and/or key topics of the guidance template. The second particular threshold may be an ad-hoc value decided by previous experiments/experience, may be determined by some training data, may be determined by machine learning, or some combination thereof. An example of the second particular threshold may be 0.9, which may indicate that the curation 218 includes the extracted keywords and/or key topics of the guidance template. In response to the calculated similarly not being above the second particular threshold, the curation-level guidance module 208 may determine which of the extracted keywords are not included in the curation 218.

Additionally or alternatively, the curation-level guidance module 208 may determine whether the curation 218 includes one or more of the subsets of the extracted keywords. For example, the curation-level guidance module 208 may determine whether the curation 218 includes each of the extracted keywords in a first subset of extracted keywords, which may have an assigned weight of 1. In response to the curation 218 not including one or more of the extracted keyword of the subset of the extracted keywords, the curation-level guidance module 208 may determine which of the extracted keywords are not included in the curation 218.

The curation-level guidance module 208 may determine the one or more key topics that are associated with the extracted keywords that are not included in the curation 218. The curation-level guidance module 208 may generate the curation-level message 216 that may include a suggestion to add the key topic related to the missing extracted keywords to the curation 218. The curation-level guidance module 208 may communicate the curation-level messages 216 to the communication module 202, which may communicate the curation-level messages 216 to the student device 104 and/or the student module 106.

The suggested modifications 212 may be received at the student device 104 and/or the student module 106. The student may implement one or more of the suggested modifications 212 to amend the curation 218. The curation 218 may be communicated back to the curation server 110. The communication module 202 may receive the curation 218 with the amendments and may further communicate the curation 218 with the amendments to the curation-level guidance module 208 and the item-level guidance module 206. The curation-level guidance module 208 and the item-level guidance module 206 may re-assess the curation 218 to determine which of the suggested modifications 212 are implemented by the student. The curation-level guidance module 208 and the item-level guidance module 206 may communicate a signal indicating which suggested modifications are implemented to the reward module 210.

The reward module 210 may reward the student a particular number of points based on the implemented suggested modifications. For example, an amendment to a structure may receive one point, an amendment to add a key topic may receive one point, an amendment to amend a sentence may receive one point, etc. The reward module 210 may generate a self-assessment 238 and/or a report 242. The self-assessment 238 may include an enumeration of the amendments and points received therefor. The report may include the suggested modifications 212 communicated to the student; the items, key topics, structural components to which the suggested modifications 212 pertain, the points received for the amendments, a duration of time the student invested in the curation 218, other information, or some combination thereof.

In some embodiments, the curation-level assessment and/or the item-level assessment may result in no suggested modifications 212. In response, the self-assessment 238 and/or the report 242 may indicate that no suggested modifications 212 resulted. The reward module 210 may reward a particular number of points for the curation 218 with no suggested modifications 212 such as 30 points.

Figure 3A:
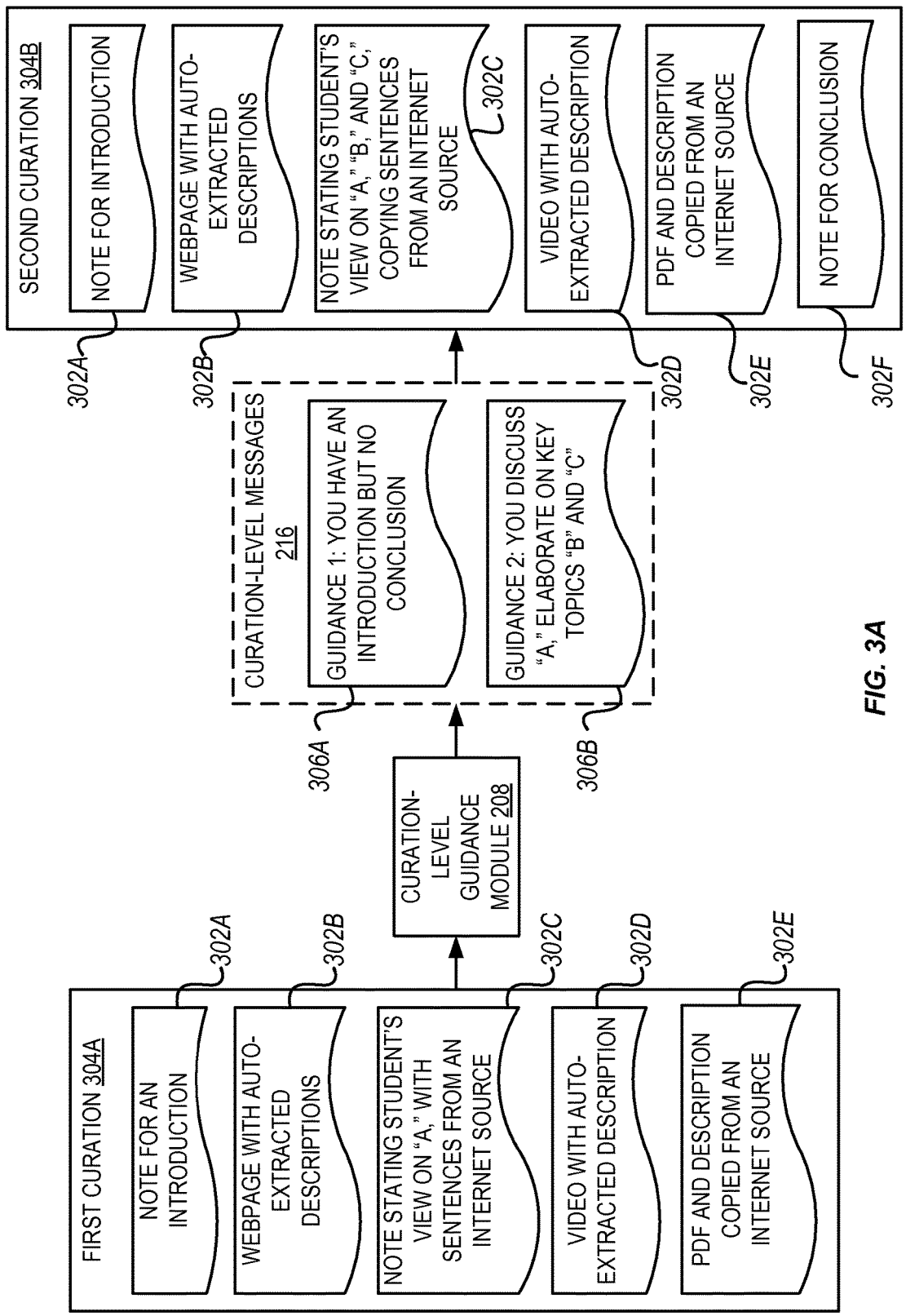
FIGS. 3A-3C illustrate a block diagram of an example content curation (curation) and amendments to the curation that may occur in the assignment guidance system of FIG. 2.
Figure 3B:
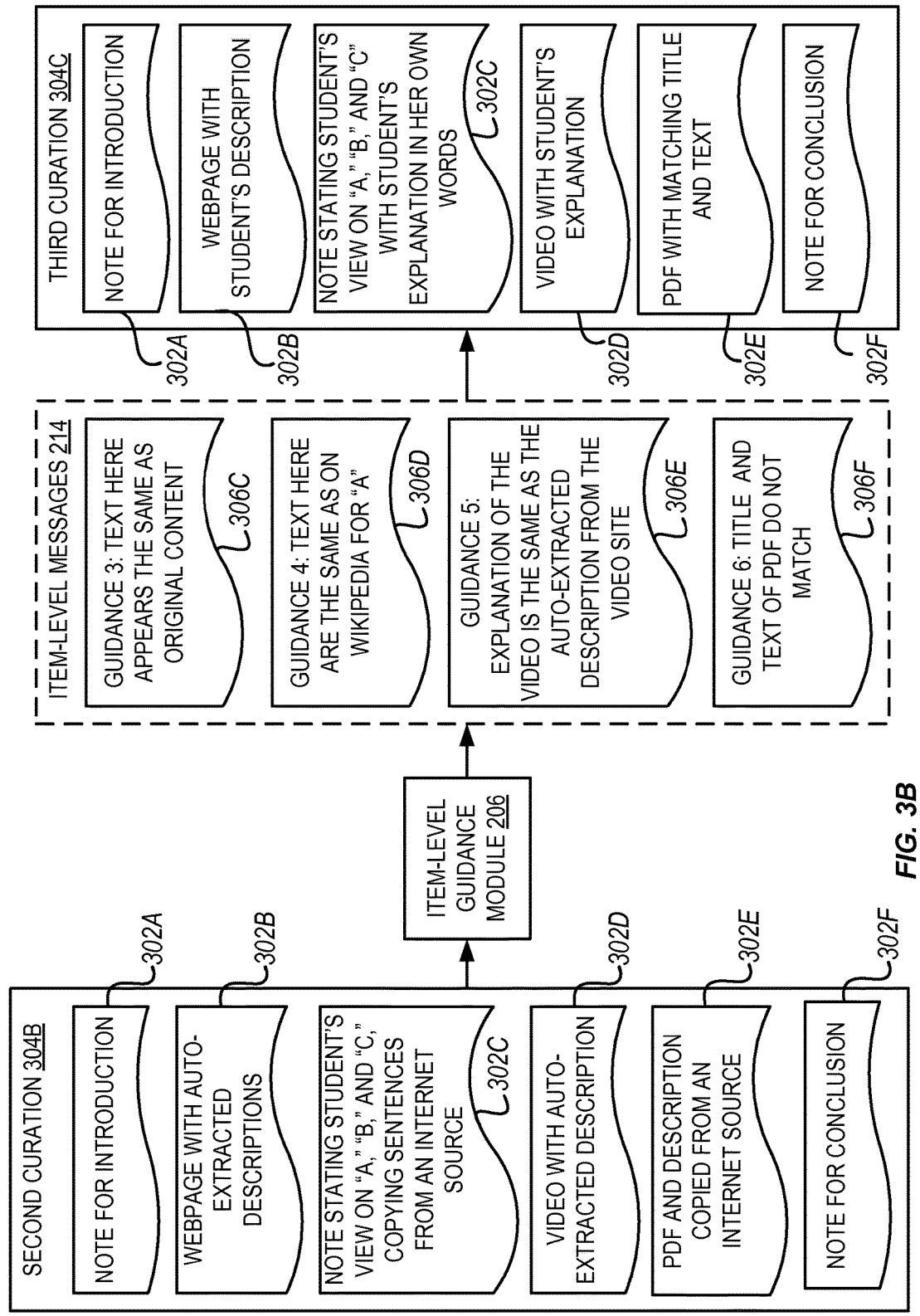
Figure 3C:
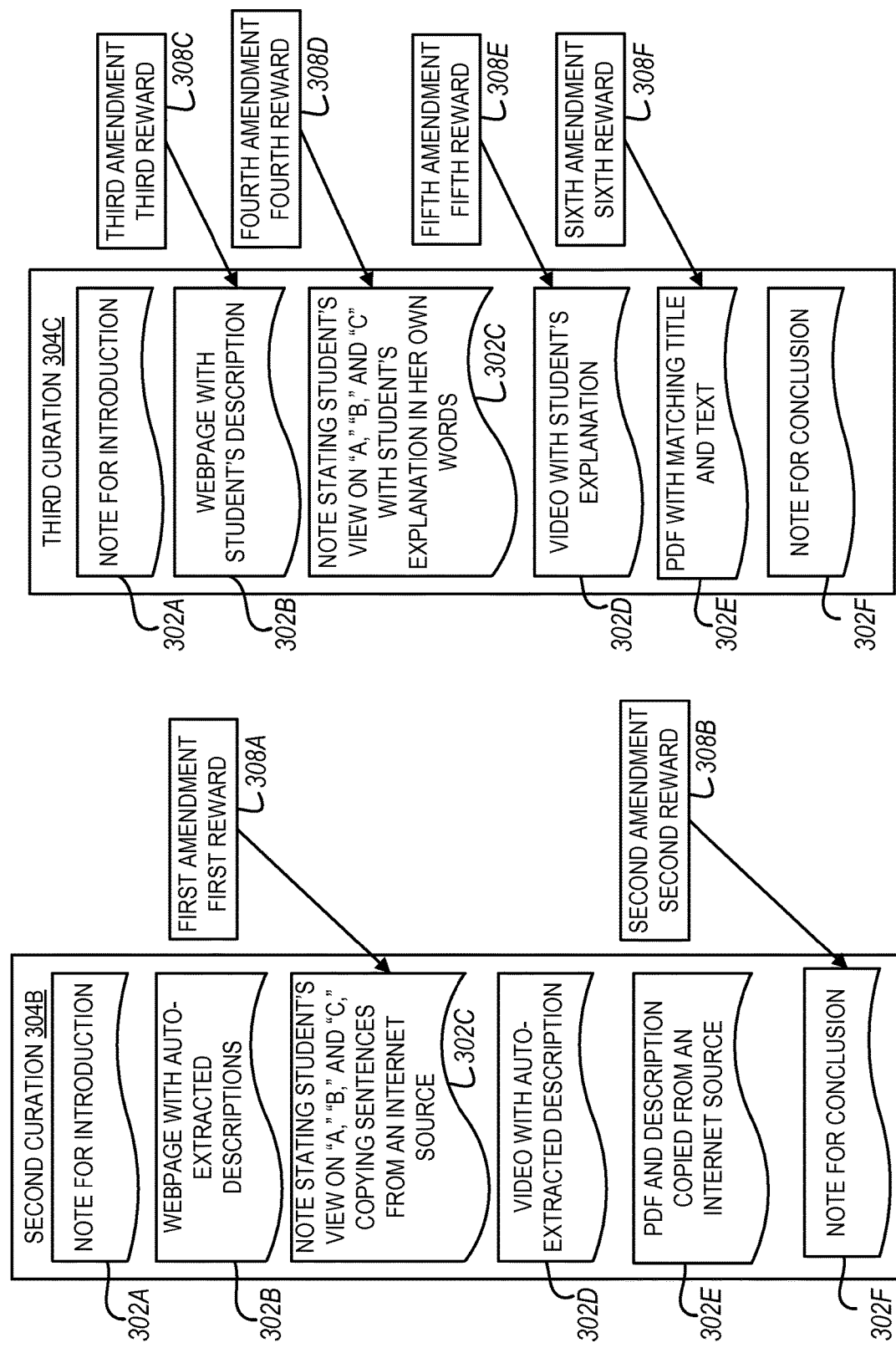

FIGS. 3A-3C illustrate a block diagram of example curations 304A-304C (generally, curation 304 or curations 304) and amendments to the curation 304 that may occur in the guidance system 200. The curation 304 may be an example of the curation 218 discussed with reference to FIG. 2. Generally, FIG. 3A depicts example amendments to the curation 304 that may result from the curation-level guidance module 208, FIG. 3B depicts example amendments to the curation that may result from the item-level guidance module 206, and FIG. 3C depicts an example of rewards that may be rewarded based on implemented suggested modifications.

Referring to FIG. 3A, a first curation 304A may represent an initial curation communicated from a student. The first curation 304A may include one or more items 302A-302E. For example, the first curation 304A includes a first item 302A, a second item 302B, a third item 302C, a fourth item 302D, and a fifth item 302E. The first item 302A may include a note for an introduction. The second item 302B may include a webpage with auto-extracted descriptions. The third item 302C may include a note stating the student's view on "A," which may be a topic, with sentences from an internet source. The fourth item 302D may include a video with an auto-extracted description. The fifth item 302E may include a portable document format (PDF) document and a description thereof copied from an internet source. The first curation 304A may be received by the curation-level guidance module 208.

The curation-level guidance module 208 may perform a curation-level assessment to generate the curation-level messages 216. In the embodiment of FIG. 3A, the curation-level messages 216 include a first message 306A and a second message 306B. The first message 306A may be related to the structure of the first curation 304A. In particular, the first curation 304A may have omitted a conclusion. Accordingly, the first message 306A may include "Guidance 1: you have an introduction but no conclusion." Additionally, it may be determined that key topics "B" and "C" may have been omitted. Accordingly, the second message 306B may include "Guidance 2: you discuss 'A,' elaborate on key topics 'B' and 'C.'"

The first and second messages 306A and 306B may be communicated to a student, who may amend the first curation 304A to create a second curation 304B. In the second curation 304B, a sixth item 302F may be added. The sixth item 302F may be responsive to the first message 306A. For example, the sixth item 302F may include a note for a conclusion. Additionally, in the second curation 304B, the third item 302C may include an amended response that addresses the second message 306B. For example, the third item 302C may have been amended to include a note stating the student's view on "A," "B," and "C," copying sentences from an internet source.

Referring to FIG. 3B, the second curation 304B may be received by the item-level guidance module 206. The item-level guidance module 206 may perform an item-level assessment on the second curation 304B. Based on the item-level assessment, the item-level guidance module 206 may generate the item-level messages 214. The item-level messages 214 may include a third message 306C, a fourth message 306D, a fifth message 306E, and a sixth message 306F. The item-level assessment may include a determination that the second item 302B includes an auto-extracted description that is without input from the student. Accordingly, the third message 306C may include "Guidance 3: text here appears the same as original content."

The item-level assessment may include a determination that the fourth item 302D includes plagiarized text. Accordingly, the fourth message 306D may include "Guidance 4: text here are the same as on WIKIPEDIA® for 'A.'"

The item-level assessment may also include a determination that the fourth item 302D includes an auto-extracted description that is without input from the student. Accordingly, the fifth message 306E may include "Guidance 5: explanation of the video is the same as the auto-extracted description from the video site." Additionally, the item-level assessment may include a determination that in the fifth item 302E, the title and the text of the PDF do not match or substantially match the original content. Accordingly, the sixth message 306F may include "Guidance 6: title and text of PDF do not match."

The third, fourth, fifth, and sixth messages 306C-306F may be communicated to the student, who may amend the second curation 304B to create a third curation 304C. In the third curation 304C, the second, third, fourth, and fifth items 302B-302D may be amended responsive to the third, fourth, fifth, and sixth messages 306C-306F, respectively. In particular, the second item 302B may have been amended to include a "webpage with student's description," the third item 302C may have been amended to include "note stating student's view on 'A,' 'B,' and 'C' with student's explanation in her own words," the fourth item 302D may have been amended to include a "video with student's explanation," and the fifth item 302E may have been amended to include a "PDF with matching title and text."

FIG. 3C illustrates an example of rewards 308A-308F that may be received for amending the first and second curations 304A and 304B. In FIG. 3A, the second curation 304B includes a first amendment of including a student's view on "B" and "C." Accordingly a first reward 308A may be received. Additionally, a second reward 308B may be received for the addition of the sixth item 302F to the first curation 304A of FIG. 3A. Likewise, a third reward 308C, a fourth reward 308D, a fifth reward 308E, and a sixth reward 308F may be received for amendments to the second, third, fourth, and fifth items 302B-302E.

In the example illustrated in FIGS. 3A-3C, the curation-level assessment is performed first that results in the second curation 304B, and then the item-level assessment is performed that results in the third curation 304C. In other embodiments, the item-level assessment may be performed before the curation-level assessment, which may result in creation of the third curation 304C prior to the second curation 304B. Moreover, in some embodiments, the item-level assessment and the curation-level assessment may be performed at least partially concurrently and/or the messages 306A-306F may be communicated together to the student such that a curation including amendments in the second curation 304B and the third curation 304C is created.

Figure 4A:
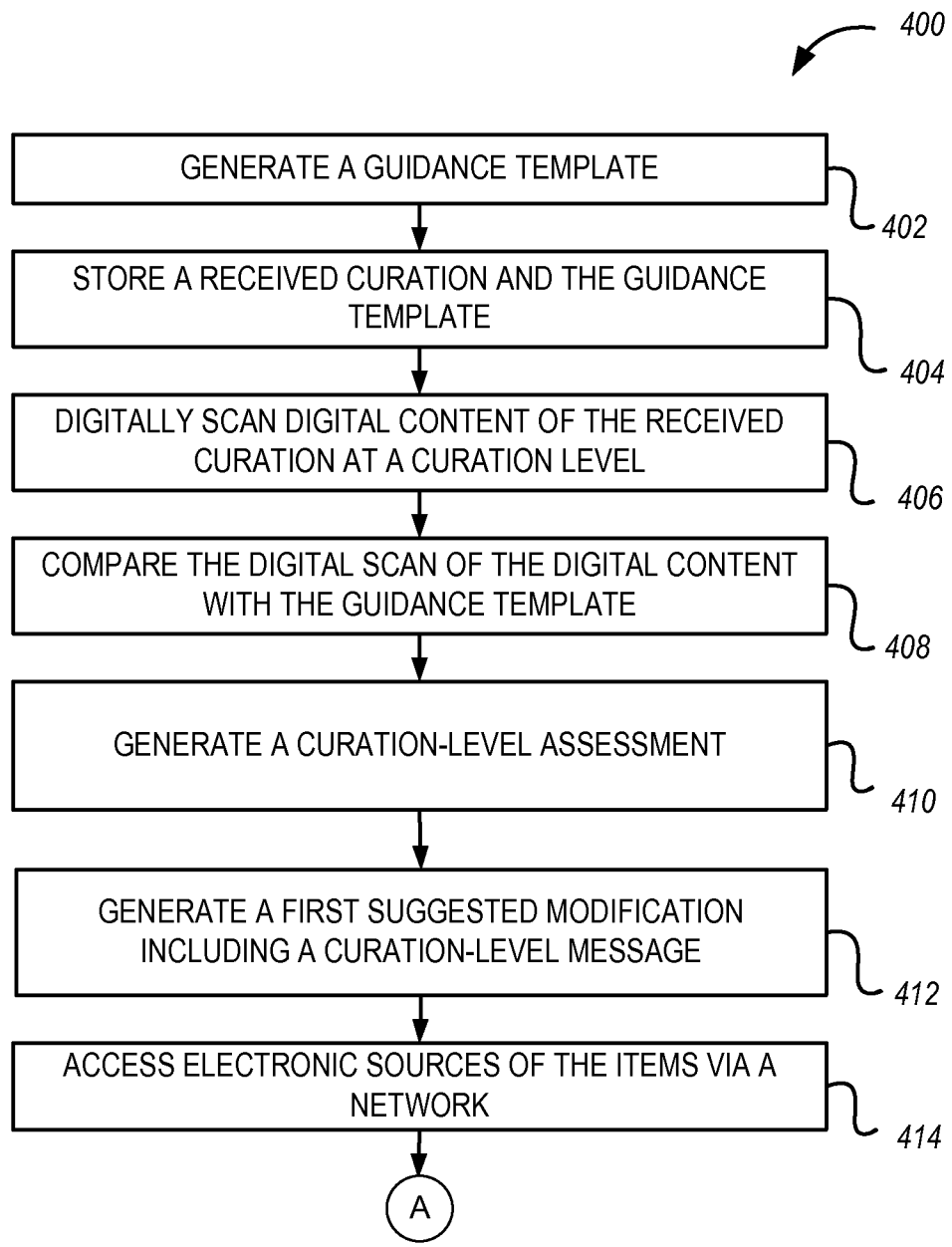
FIGS. 4A and 4B illustrate a flow diagram of an example method of assignment guidance.
Figure 4B:
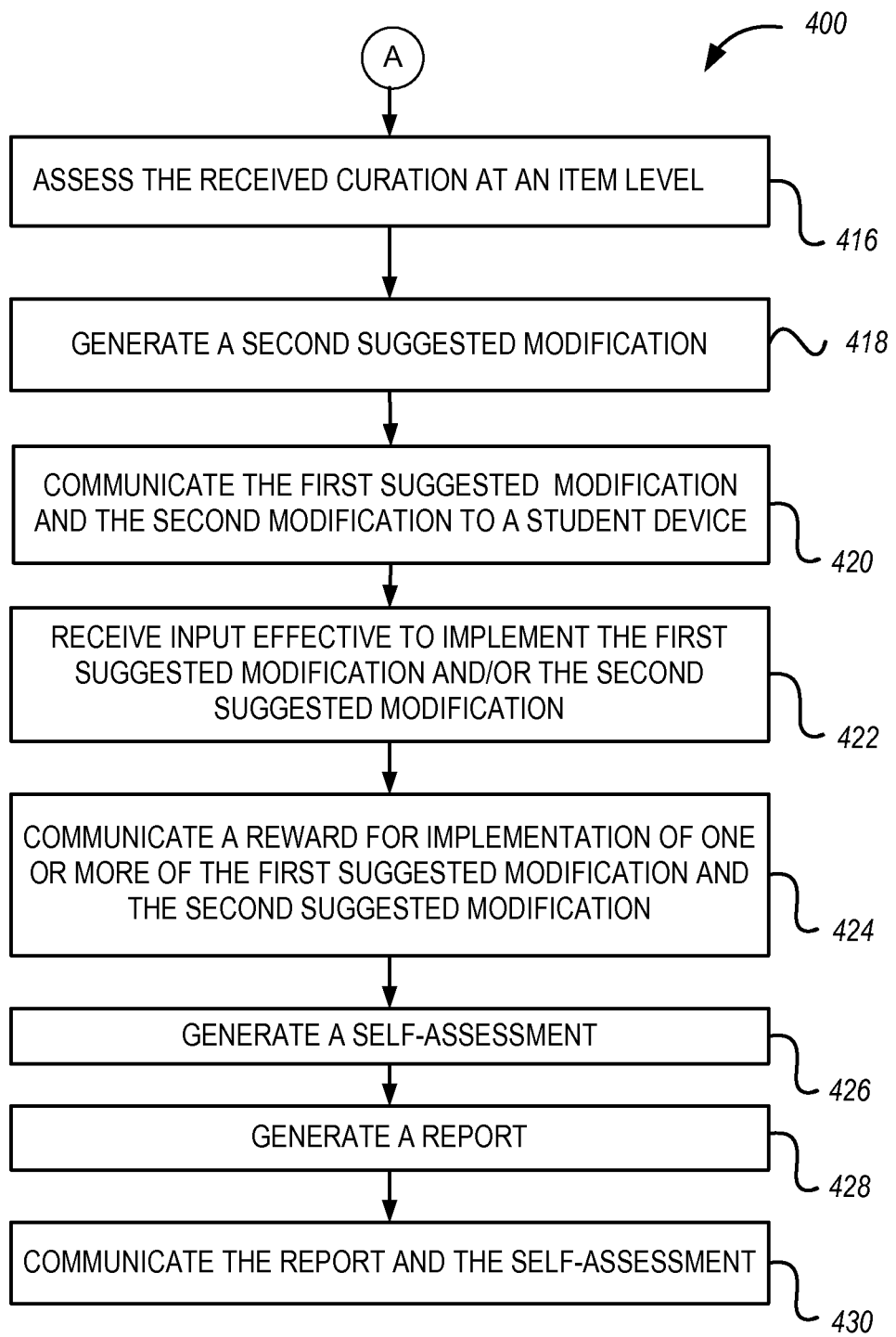

FIG. 4 illustrates a flow diagram of an example method 400 of assignment guidance, arranged in accordance with at least one embodiment described herein. The method 400 may be performed in an assignment guidance system such as in the guidance system 200 of FIG. 2 or in the learning environment 100 of FIG. 1. The method 400 may be programmably performed in some embodiments by the curation server 110 described herein. The curation server 110 may include or may be communicatively coupled to a non-transitory computer-readable medium (e.g., the memory 222 of FIG. 2) having stored thereon or encoded therein programming code or instructions that are executable by a processor to perform or control performance of the method 400. Additionally or alternatively, the curation server 110 may include a processor (e.g., the processor 224 of FIG. 2) that is configured to execute computer instructions to perform or control performance of the method 400. Although illustrated as discrete blocks, various blocks may be divided into additional blocks, combined into fewer blocks, or eliminated, depending on the desired implementation.

The method 400 may begin at block 402. At block 402, a guidance template may be generated. The guidance template may be generated for an assignment that includes creation of a curation. At block 404, a received curation and the guidance template may be stored. For example, the received curation and the guidance template may be, at least temporarily, in one or more non-transitory media. The received curation may include one or more electronic items that are organized relative to one another.

At block 406, digital content of the received curation may be digitally scanned at a curation level. At block 408, the digital scan of the digital content may be compared with the guidance template. At block 410, a curation-level assessment may be generated of the received content. The curation-level assessment may be based on the comparison between the digital scan of the content and the guidance template. At block 412, a first suggested modification may be generated including a curation-level message. The first suggested modification may be based on the curation-level assessment. The curation-level message may suggest an amendment that conforms the received curation to the guidance template.

At block 414, electronic sources of the items may be accessed via a network. the received curation may be assessed at an item level. At block 416, the received curation may be assessed at an item level. For example, the received curation may be assessed based on accessed electronic sources. At block 418, a second suggested modification may be generated. The second suggested modification may include an item-level message. The second suggested modification may be based on the item-level assessment. The item-level message may suggest an amendment that conforms the received curation to the guidance template.

At block 420, the first suggested modification and the second suggested modification may be communicated to a student device.

At block 422, input effective to implement one or both of the first suggested modification and the second suggested modification may be received. The input may be received from the student. At block 424, a reward for implementation of one or both of the first suggested modification and the second suggested modification may be communicated to the student device via the network. At block 426, a self-assessment may be generated. The self-assessment may include one or more of rewards, the first suggested modification, and the second suggested modification. At block 428, a report may be generated. The report may include one or more of the rewards, the first suggested modification, the second suggested modification, and a duration of time spent on the received curation. At block 430, the report and/or the self-assessment may be communicated. For example, the report may be communicated to a teacher and the self-assessment may be communicated to the student and/or the teacher.

One skilled in the art will appreciate that, for this and other procedures and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the disclosed embodiments.

Figure 5:
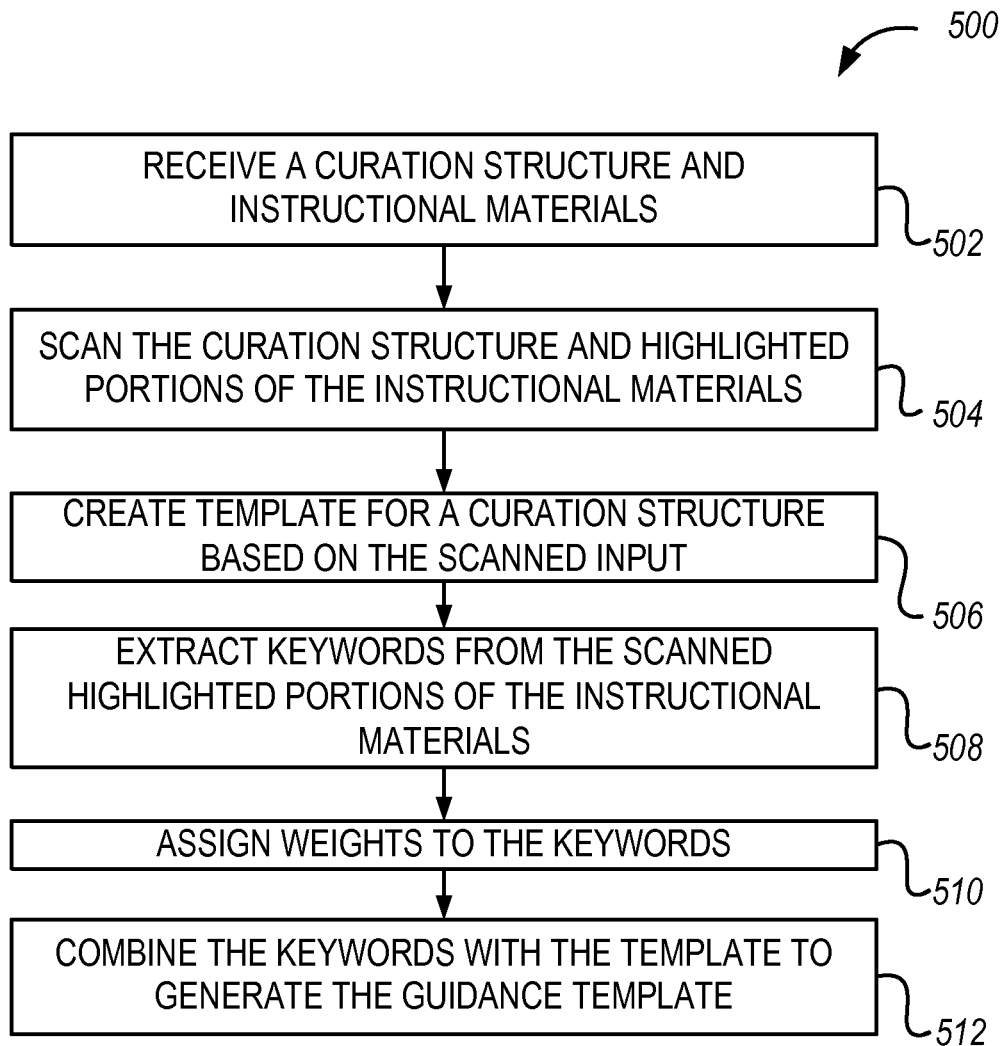
FIG. 5 illustrates a flow diagram of an example method of generating a guidance template.

FIG. 5 illustrates a flow diagram of an example method 500 of generating a guidance template, arranged in accordance with at least one embodiment described herein. The method 500 may be performed in an assignment guidance system such as in the guidance system 200 of FIG. 2 or in the learning environment 100 of FIG. 1. The method 500 may be programmably performed in some embodiments by the curation server 110 described herein. The curation server 110 may include or may be communicatively coupled to a non-transitory computer-readable medium (e.g., the memory 222 of FIG. 2) having stored thereon or encoded therein programming code or instructions that are executable by a processor to perform or control performance of the method 500. Additionally or alternatively, the curation server 110 may include a processor (e.g., the processor 224 of FIG. 2) that is configured to execute computer instructions to perform or control performance of the method 500. Although illustrated as discrete blocks, various blocks may be divided into additional blocks, combined into fewer blocks, or eliminated, depending on the desired implementation.

The method 500 may begin at block 502. At block 502, a curation structure and instructional materials is received. The instructional materials may include highlighted portions. Some examples of the instructional materials may include a highlighted syllabus, highlighted lecture slides, and highlighted instructions. At block 504, the curation structure and highlighted portions of the instructional materials may be scanned. At block 506, a template may be created for a curation structure based on the digital scanning. At block 508, keywords may be extracted from the scanned highlighted portions. At block 510, weights may be assigned to the extracted keywords. The weights may be assigned based on the instructional material from which the extracted keyword is extracted. At block 512, the extracted keywords may be combined with the template to generate the guidance template.

Figure 6:
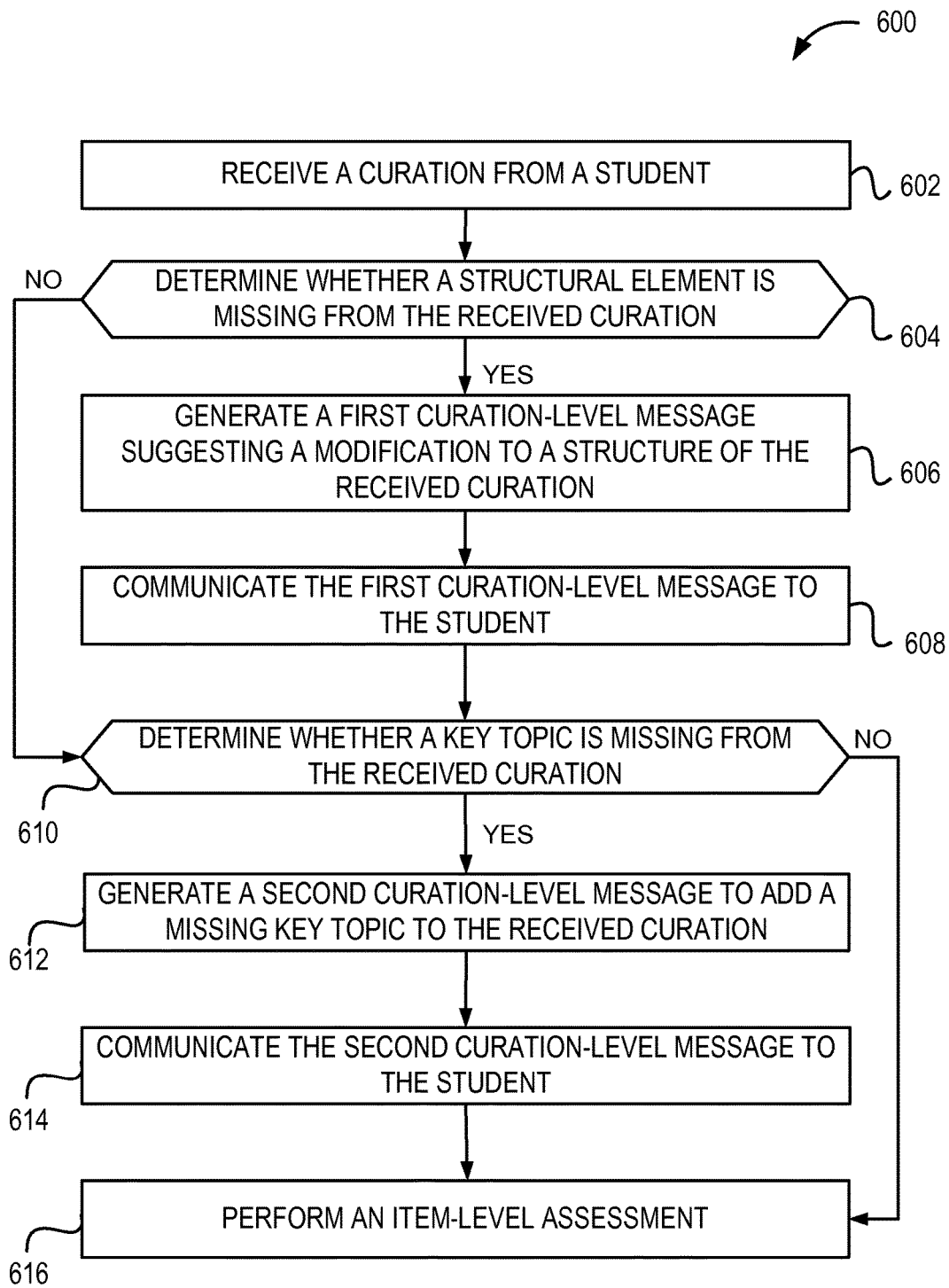
FIG. 6 illustrates a flow diagram of an example method of assessing a curation at a curation level.

FIG. 6 illustrates a flow diagram of an example method 600 of assessing a curation at a curation level, arranged in accordance with at least one embodiment described herein. The method 600 may be performed in an assignment guidance system such as in the guidance system 200 of FIG. 2 or in the learning environment 100 of FIG. 1. The method 600 may be programmably performed in some embodiments by the curation server 110 described herein. The curation server 110 may include or may be communicatively coupled to a non-transitory computer-readable medium (e.g., the memory 222 of FIG. 2) having stored thereon or encoded therein programming code or instructions that are executable by a processor to perform or control performance of the method 600. Additionally or alternatively, the curation server 110 may include a processor (e.g., the processor 224 of FIG. 2) that is configured to execute computer instructions to perform or control performance of the method 600. Although illustrated as discrete blocks, various blocks may be divided into additional blocks, combined into fewer blocks, or eliminated, depending on the desired implementation.

The method 600 may begin at block 602. At block 602, a curation may be received. The curation may be received from a student via a network in some embodiments. At block 604, it may be determined whether a structural element is missing from the received curation. In response to no structural element missing ("No" at block 604), the method may proceed to block 610. In response to a structural element missing ("Yes" at block 604), the method may proceed to block 606.

At block 606, a first curation-level message may be generated. The first curation-level message may suggest an amendment to a structure of the received curation. At block 608, the first curation-level message to amend the structure of the received curation may be communicated to the student.

At block 610, it may be determined whether a key topic is missing from the received curation. In response to no key topic missing ("No" at block 610), the method may proceed to block 616 in which an item-level assessment may be performed. In response to a key topic missing ("Yes" at block 610), the method may proceed to block 612. At block 612, a second curation-level message may be generated. The second curation-level message may suggest an amendment to add a missing key topic to the received curation. At block 614, the second curation-level message suggesting an addition of the missing key top may be communicated to the student. The method may proceed to block 616 in which an item-level assessment may be performed.

Figure 7:
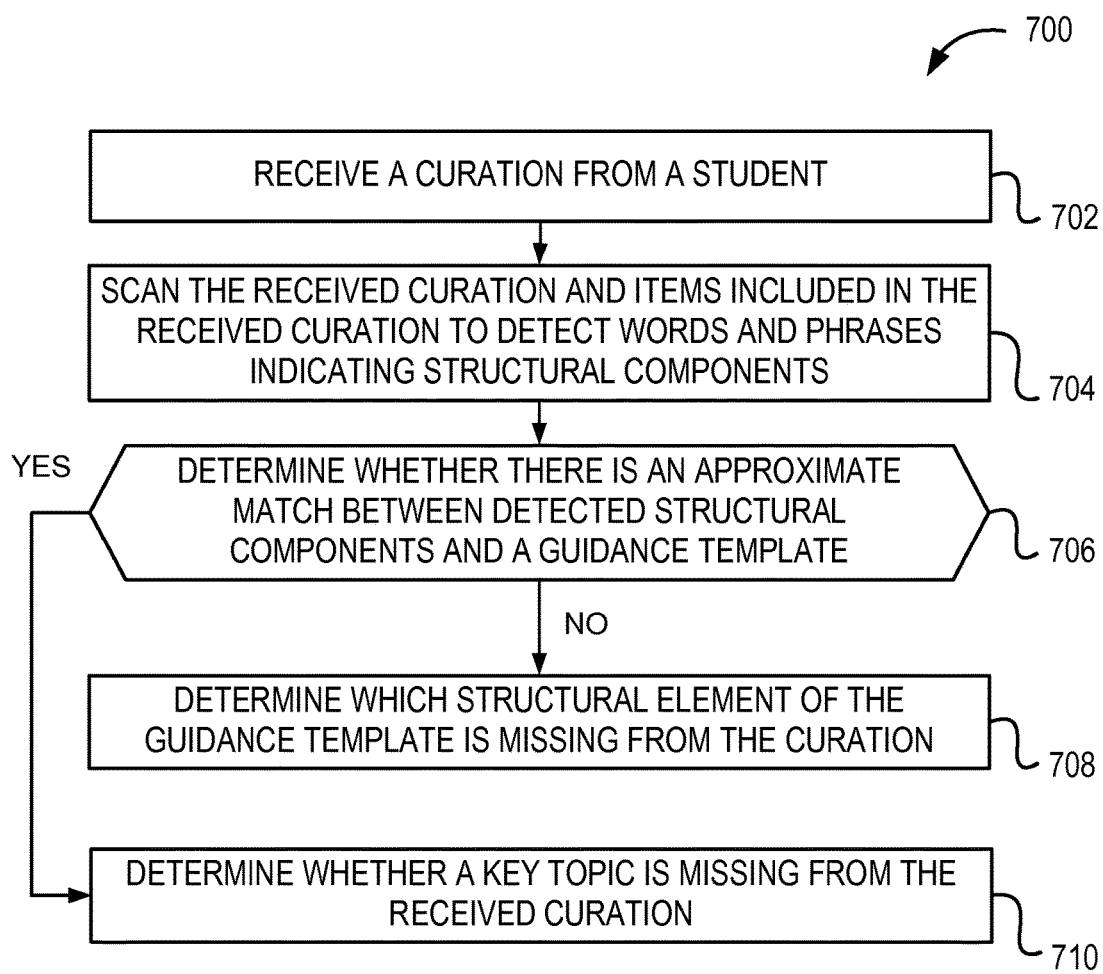
FIG. 7 illustrates a flow diagram of an example method of determining whether a structural element is missing from a curation.

FIG. 7 illustrates a flow diagram of an example method 700 of determining whether a structural element is missing from a curation, arranged in accordance with at least one embodiment described herein. The method 700 may be performed in an assignment guidance system such as in the guidance system 200 of FIG. 2 or in the learning environment 100 of FIG. 1. The method 700 may be programmably performed in some embodiments by the curation server 110 described herein. The curation server 110 may include or may be communicatively coupled to a non-transitory computer-readable medium (e.g., the memory 222 of FIG. 2) having stored thereon or encoded therein programming code or instructions that are executable by a processor to perform or control performance of the method 700. Additionally or alternatively, the curation server 110 may include a processor (e.g., the processor 224 of FIG. 2) that is configured to execute computer instructions to perform or control performance of the method 700. Although illustrated as discrete blocks, various blocks may be divided into additional blocks, combined into fewer blocks, or eliminated, depending on the desired implementation.

The method 700 may begin at block 702. At block 702, a curation may be received. The curation may be received from a student via a network in some embodiments. At block 704, the received curation and items included in the received curation may be digitally scanned to detect words and phrases indicating structural components. At block 706, it may be determined whether there is an approximate match between indicated structural components and the guidance template. In response to there being the approximate match between the indicated structural components and the guidance template ("Yes" at block 706), the method 700 may proceed to block 710. At block 710, it may be determined whether a key topic is missing from the received curation. In response to there not being the approximate match between the indicated structural components and the guidance template ("No" at block 706), the method 700 may proceed to block 708. At block 708, it may be determined which structural element of the guidance template is missing from the received curation.

Figure 8:
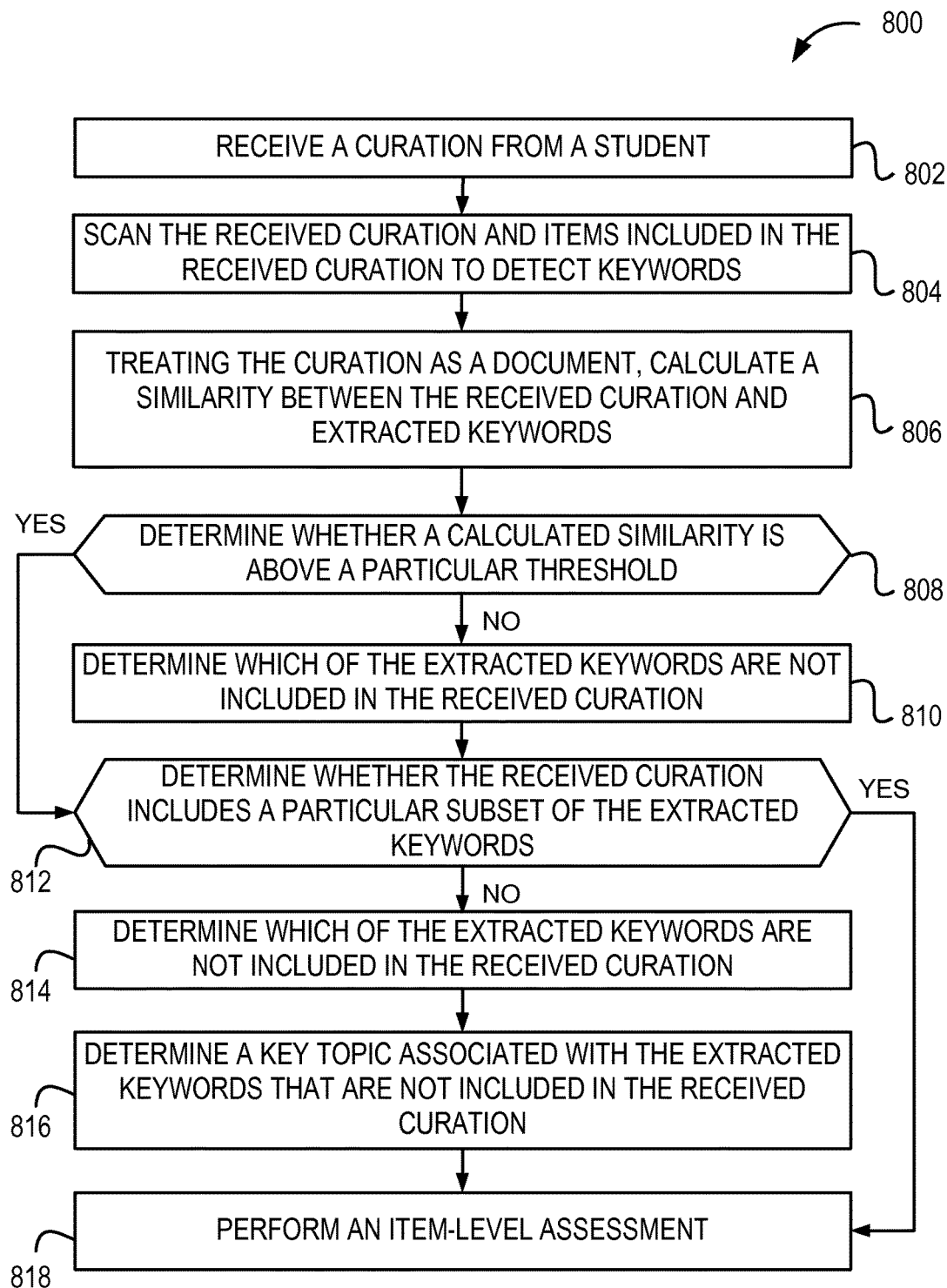
FIG. 8 illustrates a flow diagram of an example method of determining whether a key topic is missing from a curation.

FIG. 8 illustrates a flow diagram of an example method 800 of determining whether a key topic is missing from a curation, arranged in accordance with at least one embodiment described herein. The method 800 may be performed in an assignment guidance system such as in the guidance system 200 of FIG. 2 or in the learning environment 100 of FIG. 1. The method 800 may be programmably performed in some embodiments by the curation server 110 described herein. The curation server 110 may include or may be communicatively coupled to a non-transitory computer-readable medium (e.g., the memory 222 of FIG. 2) having stored thereon or encoded therein programming code or instructions that are executable by a processor to perform or control performance of the method 800. Additionally or alternatively, the curation server 110 may include a processor (e.g., the processor 224 of FIG. 2) that is configured to execute computer instructions to perform or control performance of the method 800. Although illustrated as discrete blocks, various blocks may be divided into additional blocks, combined into fewer blocks, or eliminated, depending on the desired implementation.

The method 800 may begin at block 802. At block 802, a curation may be received. The curation may be received from a student via a network in some embodiments. At block 804, the received curation and items included in the received curation may be digitally scanned to detect keywords of the received curation. At block 806, a similarity between the received curation and the extracted keywords may be calculated. In some embodiments, when calculating the similarity, the received curation may be treated as a document.

At block 808, it may be determined whether a calculated similarity is above a particular threshold. In response to the calculated similarly being above the particular threshold ("Yes" at block 808), the method 800 may proceed to block 812. In response to the calculated similarly not being above the particular threshold ("No" at block 808), the method 800 may proceed to block 810. At block 810, it may be determined which of the extracted keywords are not included in the received curation.

At block 812, it may be determined whether the received curation includes a particular subset of the extracted keywords. In response to the received curation including a particular subset of the extracted keywords ("Yes" at block 812), the method 800 may proceed to block 818. In response to the received curation not including a particular subset of the extracted keywords ("No" at block 812), the method 800 may proceed to block 814. At block 814, it may be determined which of the extracted keywords are not included in the received curation. At block 816, a key topic associated with the extracted keywords that are not included in the received curation may be determined. At block 818, an item-level assessment may be performed.

Figure 9:
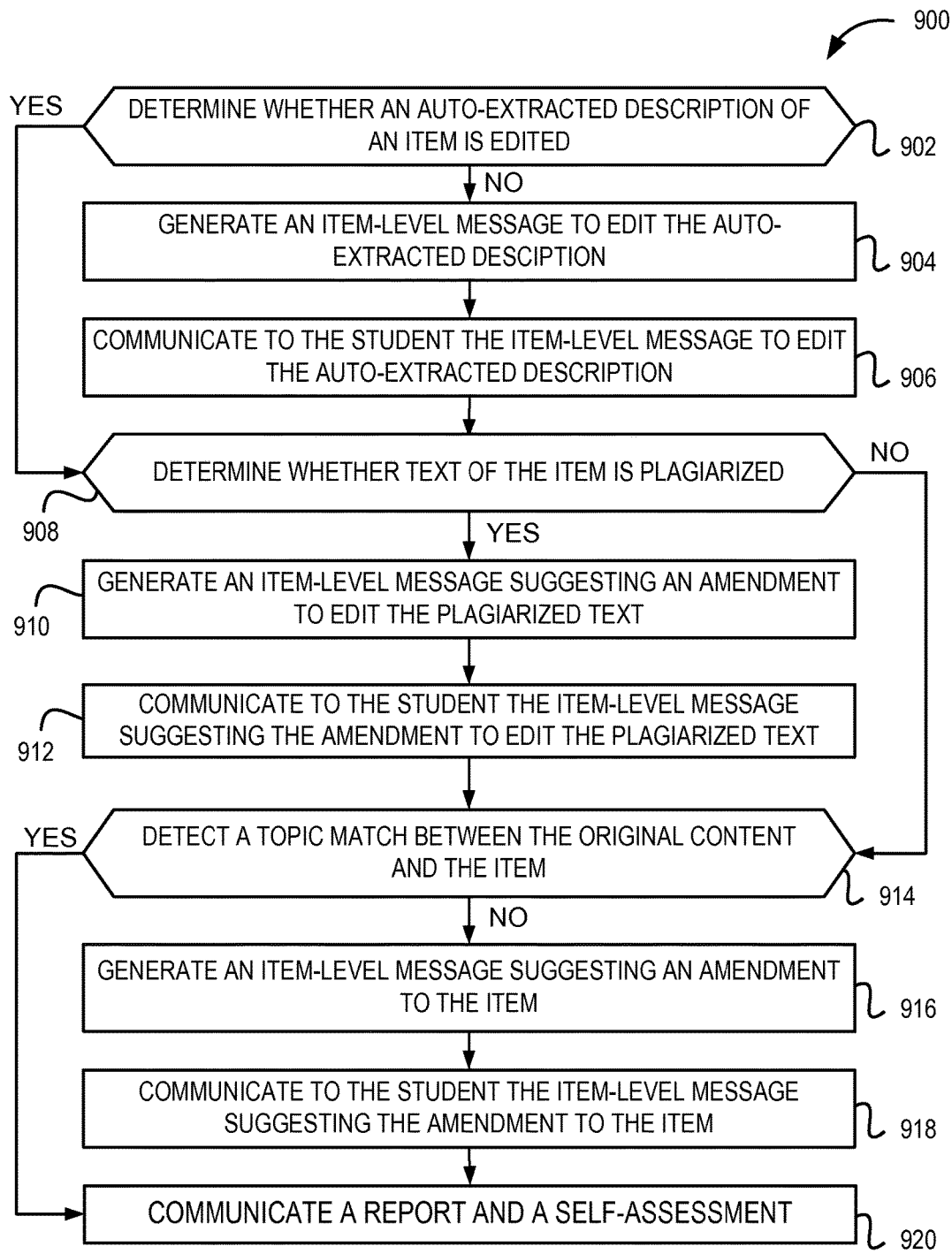
FIG. 9 illustrates a flow diagram of an example method of assessing a curation at an item level, all arranged in accordance with at least one embodiment described herein.

FIG. 9 illustrates a flow diagram of an example method 900 of assessing a curation at an item level, arranged in accordance with at least one embodiment described herein. The method 900 may be performed in an assignment guidance system such as in the guidance system 200 of FIG. 2 or in the learning environment 100 of FIG. 1. The method 900 may be programmably performed in some embodiments by the curation server 110 described herein. The curation server 110 may include or may be communicatively coupled to a non-transitory computer-readable medium (e.g., the memory 222 of FIG. 2) having stored thereon or encoded therein programming code or instructions that are executable by a processor to perform or control performance of the method 900. Additionally or alternatively, the curation server 110 may include a processor (e.g., the processor 224 of FIG. 2) that is configured to execute computer instructions to perform or control performance of the method 900. Although illustrated as discrete blocks, various blocks may be divided into additional blocks, combined into fewer blocks, or eliminated, depending on the desired implementation.

The method 900 may begin at block 902. At block 902, it may be determined whether an auto-extracted description of an item is edited by a student. In response to the auto-extracted description of the item being edited ("Yes" at block 902), the method 900 may proceed to block 908. In response to the auto-extracted description of the item not being edited ("No" at block 902), the method 900 may proceed to block 904. At block 904, an item-level message suggesting an amendment to edit the auto-extracted description may be generated. At block 906, the item-level message suggesting the amendment to edit the auto-extracted description may be communicated to the student.

At block 908, it may be determined whether text of the item is plagiarized. In response to the text of the item not being plagiarized ("No" at block 908), the method 900 may proceed to block 914. In response to the text of the item being plagiarized ("Yes" at block 908), the method 900 may proceed to block 910. At block 910, an item-level message suggesting an amendment to edit the plagiarized text may be generated. At block 912, the item-level message suggesting the amendment to edit the plagiarized text may be communicated to the student.

At block 914, a topic match between the original content and the item may be detected. In response to there being a topic match between the original content and the item ("Yes" at block 914), the method 900 may proceed to block 920. In response to there not being a topic match between the original content and the item ("No" at block 914), the method 900 may proceed to block 916. At block 916, an item-level message suggesting an amendment to the item may be generated. At block 918 the item-level message suggesting the amendment to the item may be communicated to the student. At block 920, a report and/or a self-assessment may be communicated. The report and/or the self-assessment may reflect one or more of the item-level messages. The report may be communicated to a teacher and the self-assessment may be communicated to the student and/or the teacher.

In some embodiments, the detecting the topic match may include determining whether one or more of a title and a description of the item matches a title and a description respectively of a source. In response to one or more of the title and the description of the item not matching the title and the description of the source, generating an item-level message suggesting an amendment to one or more of the title and the description of the item to match the title and the description of the source and communicating to the student the item-level message suggesting the amendment to one or more of the title and the description of the item.

The embodiments described herein may include the use of a special-purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general-purpose or special-purpose computer. By way of example, and not limitation, such computer-readable media may comprise non-transitory computer-readable storage media including RAM, ROM, EEPROM, CD-ROM or other optical disk storage, magnetic disk storage or other magnetic storage devices, or any other storage medium which may be used to carry or store desired program code in the form of computer-executable instructions or data structures and which may be accessed by a general-purpose or special-purpose computer. Combinations of the above may also be included within the scope of computer-readable media.

Computer-executable instructions comprise, for example, instructions and data which cause a general-purpose computer, special-purpose computer, or special-purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" may refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed is:

1. A method comprising:
generating, by one or more processors, a guidance template for an assignment that includes creation of a content curation, wherein the guidance template includes a combination of keywords extracted from a scanned highlighted portion of instructional materials with a template for a curation structure;
storing a received curation and the guidance template, at least temporarily, in one or more non-transitory media, the received curation including one or more electronic items that are organized relative to one another;
digitally scanning, by the one or more processors, digital content of the received curation at a curation level;
comparing, by the one or more processors, the digital scan of the digital content with the guidance template;
generating, by the one or more processors, a curation-level assessment of the received content based on the comparison between the digital scan of the digital content and the guidance template;
based on the curation-level assessment, generating, by the one or more processors, a first suggested modification including a curation-level message that suggests an amendment that conforms the received curation to the guidance template;
accessing, by the one or more processors, electronic sources of the one or more electronic items via a network;
based on the accessed electronic sources, assessing the received curation at an item level by the one or more processors, wherein the assessing the received curation at the item level includes:
determining whether an auto-extracted description of an item is edited by a student, the determining achieved via a calculation of a cosine between a first vector and a second vector, the first vector a representation of the auto-extracted description and any edits thereto and the second vector a representation of an original description as found via the network; and
generating an item-level message suggesting an amendment to edit the auto-extracted description in response to the auto-extracted description of the item not being edited;
based on an item-level assessment, generating, by the one or more processors, a second suggested modification including an item-level message that suggests an amendment that conforms the received curation to the guidance template;
communicating the first suggested modification and the second suggested modification to a student device via the network;
receiving input effective to implement one or more of the first suggested modification and the second suggested modification from the student device via the network; and
communicating a reward for implementation of one or more of the first suggested modification and the second suggested modification to the student device via the network.

2. The method of claim 1, further comprising:
generating, by the one or more processors, a self-assessment including one or more of the reward, the first suggested modification, and the second suggested modification;
communicating the self-assessment to the student device via the network;
generating, by the one or more processors, a report including one or more of the reward, the first suggested modification, the second suggested modification, and a duration of time spent on the received curation; and
communicating the report and the self-assessment to a teacher device via the network.

3. The method of claim 1, wherein the generating the guidance template includes:
receiving a curation structure and instructional materials via the network;
digitally scanning, by the one or more processors, the curation structure and a highlighted portion of the instructional materials;
based on the digitally scanned input, creating, by the one or more processors, a template for a curation structure;
extracting, by the one or more processors, one or more keywords from the scanned highlighted portion of the instructional materials; and
assigning weights, by the one or more processors, to the one or more extracted keywords based at least partially on the instructional material from which the extracted keyword is extracted.

4. The method of claim 3, wherein the instructional materials include one or more of a highlighted syllabus, a highlighted lecture slide, and a highlighted instruction.

5. The method of claim 3, wherein the assessing the received curation at the curation level includes:
determining, by the one or more processors, whether a structural element of the received curation is missing;
in response to the structural element missing, generating a curation-level message suggesting an amendment to a structure of the received curation and communicating the curation-level message to amend a structure of the received curation to the student device via the network;
determining, by the one or more processors, whether a key topic is missing from the received curation; and
in response to the key topic missing, generating a curation-level message suggesting an amendment to add a missing key topic and communicating the curation-level message to add the missing key topic to the student device via the network.

6. The method of claim 5, wherein:
the digitally scanning includes detecting words and phrases indicating structural components; and
the determining whether the structural element is missing includes:
determining whether there is an approximate match between indicated structural components and the guidance template; and
in response to there not being the approximate match between the indicated structural components and the guidance template, determining which structural element of the guidance template is missing from the received curation.

7. The method of claim 5, wherein:
the digitally scanning includes detecting keywords; and
the determining whether the key topic is missing includes:
treating the received curation as a document, calculating a similarity between the received curation and the extracted keywords;

determining whether a calculated similarity is above a particular threshold;
in response to the calculated similarly not being above the particular threshold, determining which of the extracted keywords are not included in the received curation;
determining whether the received curation includes a particular subset of the extracted keywords;
in response to the received curation not including at least one of the particular subset of the extracted keywords, determining which of the extracted keywords are not included in the received curation; and
determining a key topic associated with the extracted keywords that are not included in the received curation.

8. The method of claim 1, wherein the assessing the received curation at the item level further includes, for each item in the received curation:
determining whether text of the item is plagiarized;
in response to the text of the item being plagiarized, generating a second item-level message suggesting an amendment to edit the plagiarized text and communicating to the student the second item-level message suggesting the amendment to edit the plagiarized text;
detecting a topic match between original content and the item; and
in response to there not being a topic match between the original content and the item, generating a third item-level message suggesting an amendment to the item and communicating to the student the third item-level message suggesting the amendment to the item.

9. The method of claim 8, wherein the detecting the topic match includes:
determining whether one or more of a title and a description of the item matches a title and a description respectively of a source; and
in response to one or more of the title and the description of the item not matching the title and the description of the source, generating a fourth item-level message suggesting an amendment to one or more of the title and the description of the item to match the title and the description of the source and communicating to the student the fourth item-level message suggesting the amendment to one or more of the title and the description of the item.

10. The method of claim 1, wherein the guidance template includes a structure of a curation and key topics that include extracted keywords having assigned weights.

11. A non-transitory computer-readable medium having encoded therein programming code executable by one or more processors to perform or control performance of operations comprising:
generating a guidance template for an assignment that includes creation of a content curation, wherein the guidance template includes a combination of keywords extracted from a scanned highlighted portion of instructional materials with a template for a curation structure;
storing a received curation and the guidance template, at least temporarily, in one or more non-transitory media, the received curation including one or more electronic items that are organized relative to one another;
digitally scanning digital content of the received curation at a curation level;
comparing the digital scan of the digital content with the guidance template;
generating a curation-level assessment of the received content based on the comparison between the digital scan of the digital content and the guidance template;
based on the curation-level assessment, generating a first suggested modification including a curation-level message that suggests an amendment that conforms the received curation to the guidance template;
accessing electronic sources of the one or more electronic items via a network;
based on the accessed electronic sources, assessing the received curation at an item level, wherein the assessing the received curation at the item level includes:
determining whether an auto-extracted description of an item is edited by a student, the determining achieved via a calculation of a cosine between a first vector and a second vector, the first vector a representation of the auto-extracted description and any edits thereto and the second vector a representation of an original description as found via the network; and
generating an item-level message suggesting an amendment to edit the auto-extracted description in response to the auto-extracted description of the item not being edited;
based on an item-level assessment, generating a second suggested modification including an item-level message that suggests an amendment that conforms the received curation to the guidance template;
communicating the first suggested modification and the second suggested modification to a student device via the network;
receiving input effective to implement one or more of the first suggested modification and the second suggested modification from the student device via the network; and
communicating a reward for implementation of one or more of the first suggested modification and the second suggested modification to the student device via the network.

12. The non-transitory computer-readable medium of claim 11, wherein the operations further comprise:
generating a self-assessment including one or more of the reward, the first suggested modification, and the second suggested modification;
communicating the self-assessment to the student device via the network;
generating a report including one or more of the reward, the first suggested modification, the second suggested modification, and a duration of time spent on the received curation; and
communicating the report and the self-assessment to a teacher device via the network.

13. The non-transitory computer-readable medium of claim 11, wherein the generating the guidance template includes:
receiving a curation structure and instructional materials via the network;
digitally scanning the curation structure and a highlighted portion of the instructional materials;
based on the digitally scanned input, creating a template for a curation structure;
extracting one or more keywords from the scanned highlighted portion of the instructional materials; and
assigning weights to the one or more extracted keywords based at least partially on the instructional material from which the extracted keyword is extracted.

14. The non-transitory computer-readable medium of claim 13, wherein the instructional materials include one or more of a highlighted syllabus, a highlighted lecture slide, and a highlighted instruction.

15. The non-transitory computer-readable medium of claim 13, wherein the assessing the received curation at the curation level includes:
   determining whether a structural element of the received curation is missing;
   in response to the structural element missing, generating a curation-level message suggesting an amendment to a structure of the received curation and communicating the curation-level message to amend a structure of the received curation to the student device via the network;
   determining whether a key topic is missing from the received curation; and
   in response to the key topic missing, generating a curation-level message suggesting an amendment to add a missing key topic and communicating the curation-level message to add the missing key topic to the student device via the network.

16. The non-transitory computer-readable medium of claim 15, wherein:
   the digitally scanning includes detecting words and phrases indicating structural components; and
   the determining whether the structural element is missing includes:
      scanning the received curation and items included in the received curation to detect words and phrases indicating structural components;
      determining whether there is an approximate match between indicated structural components and the guidance template; and
      in response to there not being the approximate match between the indicated structural components and the guidance template, determining which structural element of the guidance template is missing from the received curation.

17. The non-transitory computer-readable medium of claim 15, wherein:
   the digitally scanning includes detecting keywords; and
   the determining whether the key topic is missing includes:
      treating the received curation as a document, calculating a similarity between the received curation and the extracted keywords;
      determining whether a calculated similarity is above a particular threshold;
      in response to the calculated similarly not being above the particular threshold, determining which of the extracted keywords are not included in the received curation;
      determining whether the received curation includes a particular subset of the extracted keywords;
      in response to the received curation not including at least one of the particular subset of the extracted keywords, determining which of the extracted keywords are not included in the received curation; and
      determining a key topic associated with the extracted keywords that are not included in the received curation.

18. The non-transitory computer-readable medium of claim 11, wherein the assessing the received curation at the item level includes for one or more items in the received curation:
   determining whether text of the item is plagiarized;
   in response to the text of the item being plagiarized, generating a second item-level message suggesting an amendment to edit the plagiarized text and communicating to the student the second item-level message suggesting the amendment to edit the plagiarized text;
   detecting a topic match between original content and the item; and
   in response to there not being a topic match between the original content and the item, generating a third item-level message suggesting an amendment to the item and communicating to the student the third item-level message suggesting the amendment to the item.

19. The non-transitory computer-readable medium of claim 18, wherein the detecting the topic match includes:
   determining whether one or more of a title and a description of the item matches a title and a description respectively of a source; and
   in response to one or more of the title and the description of the item not matching the title and the description of the source, generating a fourth item-level message suggesting an amendment to one or more of the title and the description of the item to match the title and the description of the source and communicating to the student the fourth item-level message suggesting the amendment to one or more of the title and the description of the item.

20. The non-transitory computer-readable medium of claim 11, wherein the guidance template includes a structure of a curation and key topics that include extracted keywords having assigned weights.

* * * * *